United States Patent
Jiang et al.

(10) Patent No.: US 12,401,858 B2
(45) Date of Patent: Aug. 26, 2025

(54) VIDEO PROCESSING METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventors: Jingxuan Jiang, Beijing (CN); Peihui Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/392,432

(22) Filed: Dec. 21, 2023

(65) Prior Publication Data

US 2024/0129591 A1    Apr. 18, 2024

Related U.S. Application Data

(63) Continuation of application No. PCT/CN2022/104106, filed on Jul. 6, 2022.

(30) Foreign Application Priority Data

Jul. 20, 2021 (CN) .................. 202110821355.7

(51) Int. Cl.
*H04N 21/4788* (2011.01)
*G06F 3/0486* (2013.01)

(52) U.S. Cl.
CPC ....... *H04N 21/4788* (2013.01); *G06F 3/0486* (2013.01)

(58) Field of Classification Search
CPC ........... H04N 21/4788; H04N 21/4312; H04N 21/4316; H04N 21/47217; H04N 21/4882;

(Continued)

(56) References Cited

U.S. PATENT DOCUMENTS 11,432,046 B1* 8/2022 Ohliger .................. G06V 20/49
2010/0153520 A1* 6/2010 Daun .................... G11B 27/034
709/218

(Continued)

FOREIGN PATENT DOCUMENTS

CN  104881237 A  9/2015
CN  106998492 A  8/2017

(Continued)

OTHER PUBLICATIONS

International Search Report (with English translation) and Written Opinion issued in PCT/CN2022/104106, dated Oct. 9, 2022, 9 pages provided.

(Continued)

*Primary Examiner* — Adil Ocak
(74) *Attorney, Agent, or Firm* — Astute IP Law Group

(57) ABSTRACT

A video processing method and apparatus, an electronic device, and a storage medium are provided. The method includes: receiving a trigger operation on a dynamic comment control associated with a video to be posted; and in response to the trigger operation, adding a dynamic comment identifier into said video so as to display the dynamic comment identifier in a video playing process.

20 Claims, 25 Drawing Sheets

(58) Field of Classification Search
CPC ........... H04N 21/8126; H04N 21/4884; H04N 21/8352; G06F 3/0486
USPC .......................................................... 725/34
See application file for complete search history.

(56) References Cited

U.S. PATENT DOCUMENTS

| | | | |
|---|---|---|---|
| 2017/0366841 | A1 | 12/2017 | Yuan et al. |
| 2020/0037034 | A1* | 1/2020 | Greyling ............ H04N 21/4725 |
| 2020/0195877 | A1 | 6/2020 | Li |
| 2020/0356782 | A1 | 11/2020 | Liu |
| 2021/0383837 | A1* | 12/2021 | Ren .................. H04N 21/47205 |

FOREIGN PATENT DOCUMENTS

| | | |
|---|---|---|
| CN | 106998505 A | 8/2017 |
| CN | 108055569 A | 5/2018 |
| CN | 108924622 A | 11/2018 |
| CN | 109379614 A | 2/2019 |
| CN | 109831674 A | 5/2019 |
| CN | 110784759 A | 2/2020 |
| CN | 111246227 A | 6/2020 |
| CN | 111901658 A | 11/2020 |
| CN | 112672219 A | 4/2021 |
| CN | 112866787 A | 5/2021 |
| CN | 113010710 A | 6/2021 |
| CN | 113038236 A | 6/2021 |
| CN | 113038239 A | 6/2021 |
| CN | 113542854 A | 10/2021 |
| EP | 3672262 A1 | 6/2020 |
| EP | 4300980 A1 | 1/2024 |

OTHER PUBLICATIONS

The extended European Search Report issued in European Application No. 22845145.6, dated on Jul. 22, 2024.
Wu et al., "Danmaku—A New Paradigm of Social Interaction via Online Videos", ACM Transactions on Social Computing, vol. 2, No. 2, Artical 7, Publication Date: Jun. 20, 2019, 24 pages provided.
Office Action for Chinese Patent Application No. 202110821355.7, mailed on Mar. 11, 2022, 19 pages.
Communication pursuant to Article 94(3) EPC for European Patent Application No. 22845145.6, mailed on Apr. 2, 2025, 6 pages.

\* cited by examiner

VIDEO PROCESSING METHOD AND APPARATUS, ELECTRONIC DEVICE, AND STORAGE MEDIUM

The present application is a continuation of International Application No. PCT/CN2022/104106, filed on Jul. 6, 2022 which claims priority to Chinese Patent Application No. 202110821355.7, titled "VIDEO PROCESSING METHOD AND APPARATUS, ELECTRONIC DEVICE, AND STORAGE MEDIUM", filed on Jul. 20, 2021 with the National Intellectual Property Administration, PRC, both of which are incorporated herein by reference in their entireties.

FIELD

The present disclosure relates to the technical field of computer technology, and in particular to a video processing method and apparatus, an electronic device and a storage medium.

BACKGROUND

Dynamic comments are an asynchronous interactive method based on the video playback progress. Currently, most products allow video viewers to manually input dynamic comments while watching videos to express their attitudes, opinions, and emotions toward the video content.

However, manually inputting dynamic comments may easily result in high costs of user generated content (UGC).

SUMMARY

In order to solve or at least partially solve the above technical problems, a video processing method and apparatus, an electronic device and a storage medium are provided according to the present disclosure.

A video processing method is provided according to an embodiment of the present disclosure, which includes:
  receiving a trigger operation on a dynamic comment control associated with a video to be posted; and
  adding a dynamic comment identification to the video to be posted, in response to the trigger operation, to display the dynamic comment identification in a process of playing the video.

A video processing method is further provided according to an embodiment of the present disclosure, which includes:
  receiving a trigger operation on a dynamic comment identification displayed on a video playing interface, where a dynamic comment content is displayed on the dynamic comment identification; and
  displaying a dynamic comment corresponding to the dynamic comment content on the video playing interface, in response to the triggering operation.

A video processing apparatus is further provided according to an embodiment of the present disclosure, which includes:
  a trigger operation receiving module configured to receive a trigger operation on a dynamic comment control associated with a video to be posted; and
  an adding module configured to add a dynamic comment identification to the video to be posted, in response to the trigger operation, to display the dynamic comment identification in the process of playing the video.

A video processing apparatus is further provided according to an embodiment of the present disclosure, which includes:
  a receiving module configured to receive a trigger operation on a dynamic comment identification of a video playing interface, where a dynamic comment content is displayed in the dynamic comment identification; and
  a display module configured to display a dynamic comment corresponding to the dynamic comment content on the video playing interface, in response to the trigger operation.

An electronic device is further provided according to an embodiment of the present disclosure, which includes: a processor; and a memory configured to store instructions executable by the processor. The processor is configured to read the executable instructions from the memory and execute the instructions to implement the video processing method according to embodiments of the present disclosure.

A computer readable storage medium is further provided according to an embodiment of the present disclosure, which stores a computer program. The computer program is configured to perform the video processing method according to embodiments of the present disclosure.

BRIEF DESCRIPTION OF THE DRAWINGS

The above and other features, advantages and aspects of embodiments of the present disclosure will become more apparent in conjunction with the drawings and with reference to the following specific embodiments. Throughout the drawings, identical or similar reference signs indicate identical or similar elements. It should be understood that the drawings are schematic and that the originals and elements are not necessarily drawn to scale.

DETAILED DESCRIPTION OF EMBODIMENTS

Figure 1:
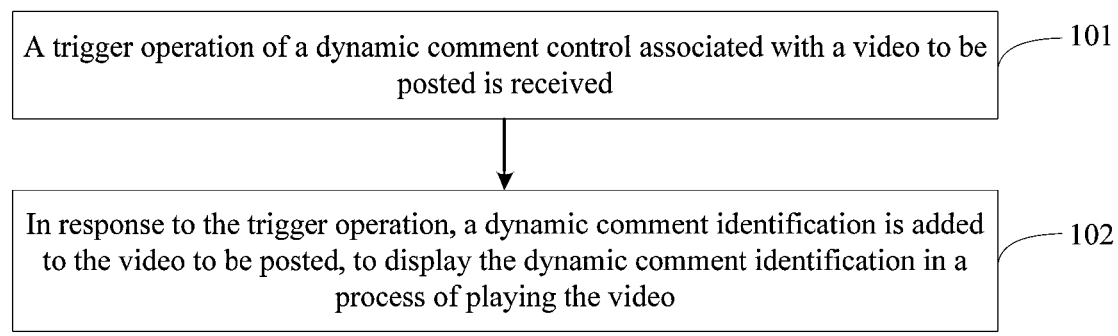
FIG. 1 is a schematic flow chart of a video processing method according to an embodiment of the present disclosure.

Embodiments of the present disclosure will be described in more detail below with reference to the drawings. Although certain embodiments of the present disclosure are shown in the drawings, it should be understood that the present disclosure may be embodied in various forms and should not be construed as limited to the embodiments set forth herein. On the contrary, these embodiments are provided to provide a more thorough and complete understanding of the present disclosure. It should be understood that the drawings and embodiments of the present disclosure are for exemplary purposes only, and are not intended to limit the protection scope of the present disclosure.

It should be understood that the various steps described in the method embodiments of the present disclosure may be executed in different orders, and/or executed in parallel. Additionally, the method embodiments may include additional steps and/or omit performing illustrated steps. The scope of the present disclosure is not limited in this respect.

As used herein, the term "comprise" and its variations are open-ended, i.e. "including but not limited to". The term "based on" means "based at least in part on". The term "one embodiment" means "at least one embodiment". The term "another embodiment" means "at least one another embodiment". The term "some embodiments" means "at least some embodiments." Relevant definitions of other terms will be given in the description below.

It should be noted that concepts such as "first" and "second" mentioned in the present disclosure are only used to distinguish different devices, modules or units, and are not used to limit the sequence of functions performed by these devices, modules or units or interdependence therebetween.

It should be noted that the modifications of "one" and "multiple" mentioned in the present disclosure are illustrative and not restrictive, and those skilled in the art should understand that unless the context clearly indicates otherwise, it should be understood as "one or more".

FIG. 1 is a schematic flowchart of a video processing method according to an embodiment of the present disclosure. The method may be performed by a video processing apparatus. The apparatus may be implemented by software and/or hardware, and generally may be integrated into an electronic device. As shown in FIG. 1, the video processing method may include the following steps 101 and 102.

In step 101, a trigger operation of a dynamic comment control associated with a video to be posted is received.

The dynamic comment control is a control that guides a video creator to add a dynamic comment identification to the video to be posted. The dynamic comment identification may be, for example, a dynamic comment icon or a dynamic comment button that guides a video viewer to send a dynamic comment. When the video viewer clicks the dynamic comment identification in the video, a dynamic comment corresponding to the dynamic comment identification may be sent at the current moment of the process of playing the video. In this way, a dynamic comment may be sent with one click without the video viewer manually editing the dynamic comment content, which reduces the cost and threshold of sending a dynamic comment.

In an embodiment of the present disclosure, the dynamic comment control may be set on a video posting page of a video posting application, for example, the dynamic comment control may be set at a predetermined position on the video posting page. When a video creator is to post a video, a dynamic comment identification may be added to one or more positions of the video to be posted by clicking the dynamic comment control at a predetermined position based on the video content of a video to be posted, thereby simplifying the operation path for a video creator adding a dynamic comment identification to the video to be posted, thus improving the adding efficiency, which facilitates improvement of the video posting efficiency and user experience. Specifically, the position of the dynamic comment control on the video posting page may be automatically configured by the video posting application, or may be customized by the video creator according to the operation habits and operation convenience, which improves the flexibility and richness of interaction.

In step 102, in response to the trigger operation, a dynamic comment identification is added to the video to be posted, to display the dynamic comment identification in a process of playing the video.

In an embodiment, the dynamic comment identification may be added to the video to be posted at any position such as the middle area, the lower right corner, and a position near the current playback progress of the video on the video playing interface, to improve the flexibility of displaying the dynamic comment identification. In addition, the size of the dynamic comment identification may be set as large as possible without blocking the content of the video playing interface, to increase the probability of a video viewer seeing the dynamic comment identification, and guide the video viewer to click on the dynamic comment identification to send a dynamic comment. For example, the dynamic comment may include a bullet screen comment.

In an embodiment of the present disclosure, when the video processing apparatus receives a trigger operation on the dynamic comment control, a dynamic comment identification is added to the video to be posted in response to the trigger operation. When the video viewer plays the video, the dynamic comment identification added by the video creator will be displayed in the process of playing the video. Under the guidance of the dynamic comment identification, the video viewer may click on the dynamic comment identification to send the corresponding dynamic comment in the video, thereby sending a dynamic comment in a one-click manner.

In an embodiment, when the video to be posted is in a playing state on the video posting page, the video creator may add the dynamic comment identification in a timely manner to the video to be posted by clicking the dynamic comment control at a specific position on the video posting page based on the content of the video playing interface at different playback progress. The display duration of the dynamic comment identification in the video to be posted may be a default duration, such as 5 seconds. The display style, size, and adding position of the dynamic comment identification may be default by the video posting application. The video creator adds the dynamic comment identification to the video based on the content of the video playing interface, giving full play to the independent creativity of the video creator, which is conducive to improving the integration of the dynamic comment and the video content.

In another embodiment, when the video to be posted is in a paused state on the video posting page, if the video processing apparatus receives a trigger operation on the dynamic comment control, the page may be jumped to a setting page of the dynamic comment identification in response to the trigger operation, to allow the video creator to add the dynamic comment identification independently based on the setting page of the dynamic comment identification. For example, the video creator may customize the adding position, display duration, display style, title and the like of the dynamic comment identification in the video to be posted in the setting page of the dynamic comment identification. The video creator may customize related information of the dynamic comment identification by providing the setting page of the dynamic comment identification. Thus, the personalized setting of the dynamic comment identification may be realized, which improves the flexibility of adding the dynamic comment identification.

Figure 2:
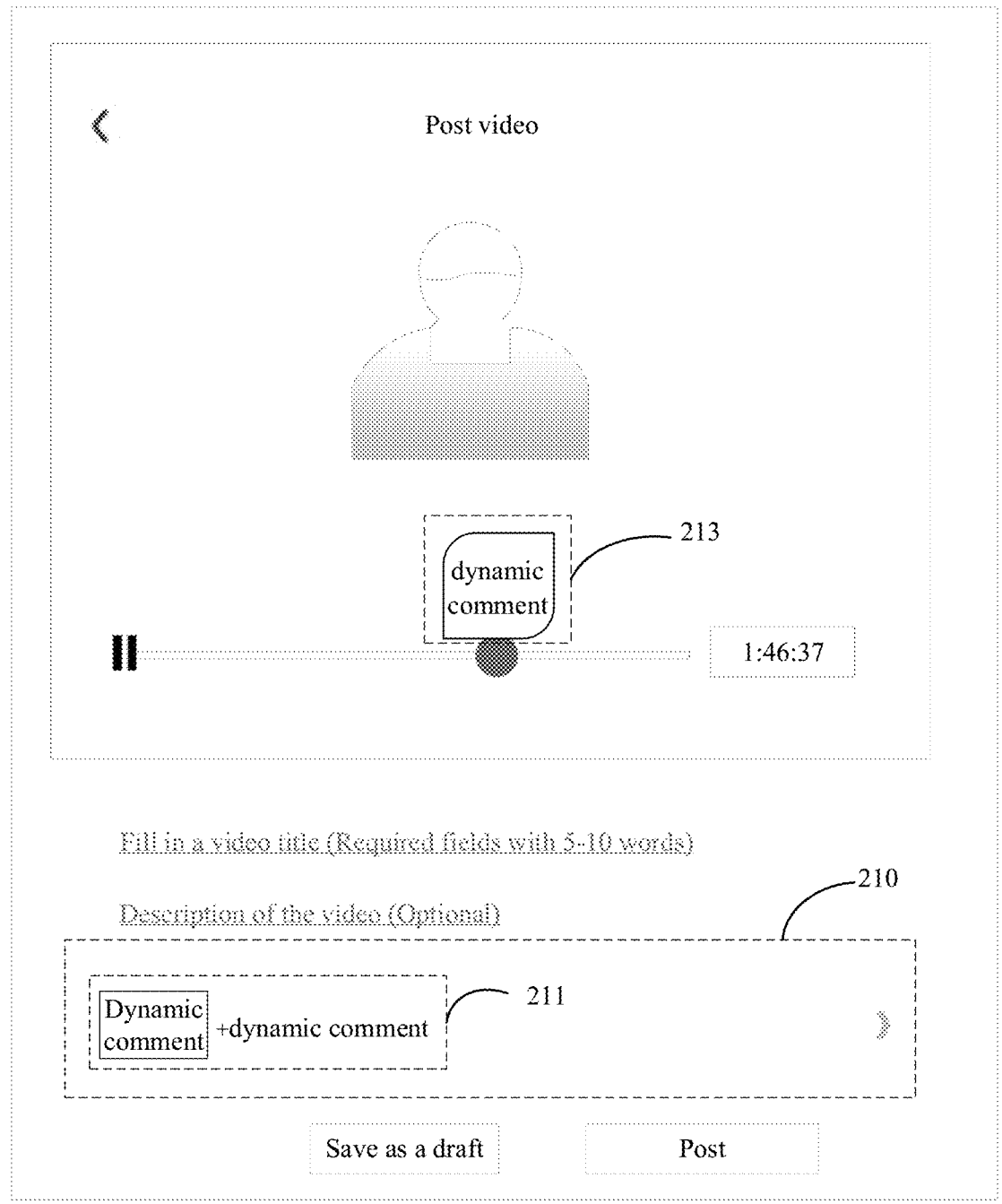
FIG. 2 is a schematic diagram of an interface of a video posting page according to an embodiment of the present disclosure.

For example, FIG. 2 is a schematic diagram of an interface of a video posting page according to an embodiment of the present disclosure. As shown in FIG. 2, a dynamic comment control 211 is displayed at a specific position 210 of the video posting page. When the video creator needs to add a dynamic comment identification to the current video playing interface, the video creator may click the dynamic comment control 211. When the video processing apparatus receives a trigger operation of the video creator on the dynamic comment control 211, a dynamic comment identification, such as the dynamic comment identification indicated by a reference numeral 213 in FIG. 2, is added to the current video playing interface in response to the trigger operation.

In the video processing method according to this embodiment, a trigger operation of the dynamic comment control associated with the video to be posted is received. In response to the trigger operation, a dynamic comment identification is added to the video to be posted, to display the dynamic comment identification in a process of playing the video. With the above technical solution, the video creator may add a dynamic comment identification to a video to be posted based on the creativity of the video creator. The video creator may add the dynamic comment identification to the video to be posted based on the video content to guide the video viewer to trigger the dynamic comment identification to send a dynamic comment, which improves the integration of the dynamic comment and the video content.

Figure 3:
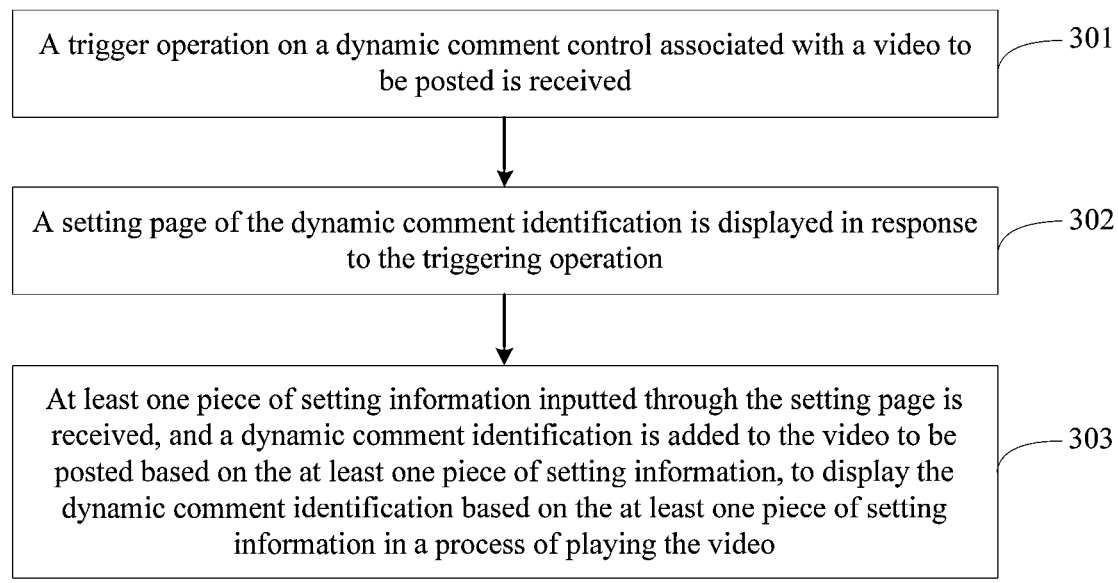
FIG. 3 is a schematic flow chart of a video processing method according to another embodiment of the present disclosure.

FIG. 3 is a schematic flowchart of a video processing method according to another embodiment of the present disclosure. On the basis of the above embodiments, a response way to the trigger operation of the dynamic comment control is provided according to this embodiment. Specifically, in response to the trigger operation, a setting page of the dynamic comment identification is displayed, to allow the video creator to automatically add the dynamic comment identification based on the setting page. The same or similar content as the above-mentioned embodiments will not be repeated in this embodiment, and related explanations may refer to the above-mentioned embodiments.

As shown in FIG. 3, a video processing method may include the following steps 301 to 303.

In step 301, a trigger operation on a dynamic comment control associated with a video to be posted is received.

In step 302, a setting page of the dynamic comment identification is displayed in response to the triggering operation.

In an embodiment of the present disclosure, a setting page of a corresponding dynamic comment identification may be set for the dynamic comment control. When a trigger operation of the video creator on the dynamic comment control is received, the current page is jumped to the setting page of the dynamic comment identification in response to the trigger operation, so that the video creator may set relevant information of the dynamic comment identification on the setting page.

In step 303, at least one piece of setting information inputted through the setting page is received, and a dynamic comment identification is added to the video to be posted based on the at least one piece of setting information, to display the dynamic comment identification based on the at least one piece of setting information in a process of playing the video.

Specifically, the setting information includes, but is not limited to, at least one of a dynamic comment title of the dynamic comment identification, a dynamic comment content of the dynamic comment identification, a start time, duration, end time, display style, display position, size and the like of the dynamic comment identification in the video to be posted.

In an embodiment, the setting information inputted by the video creator through the setting page includes at least one dynamic comment content. The receiving at least one piece of setting information inputted through the setting page, and adding a dynamic comment identification to the video to be posted based on the at least one piece of setting information, to display the dynamic comment identification based on at least one piece of setting information in a process of playing the video, includes: receiving at least one dynamic comment content inputted through the setting page, where the dynamic comment identification added to the video to be posted includes the at least one dynamic comment content, to display the dynamic comment identification including the at least one dynamic comment content in the process of playing the video; and displaying a dynamic comment corresponding to the at least one dynamic comment content on the video playing interface, in response to the trigger operation on the dynamic comment identification.

Further, the at least one dynamic comment content inputted by the video creator through the setting page may be a target dynamic comment content selected from multiple candidate dynamic comment contents preset by the system, or a dynamic comment content customized by the video creator, which is not limited in the present disclosure. Therefore, the receiving at least one dynamic comment content inputted through the setting page includes: displaying preset candidate dynamic comment contents on the setting page, receiving a target dynamic comment content determined from the candidate dynamic comment contents as the at least one dynamic comment content; and/or receiving a customized dynamic comment content inputted by the user (that is, the video creator) through the setting page, as the at least one dynamic comment content.

Figure 4A:
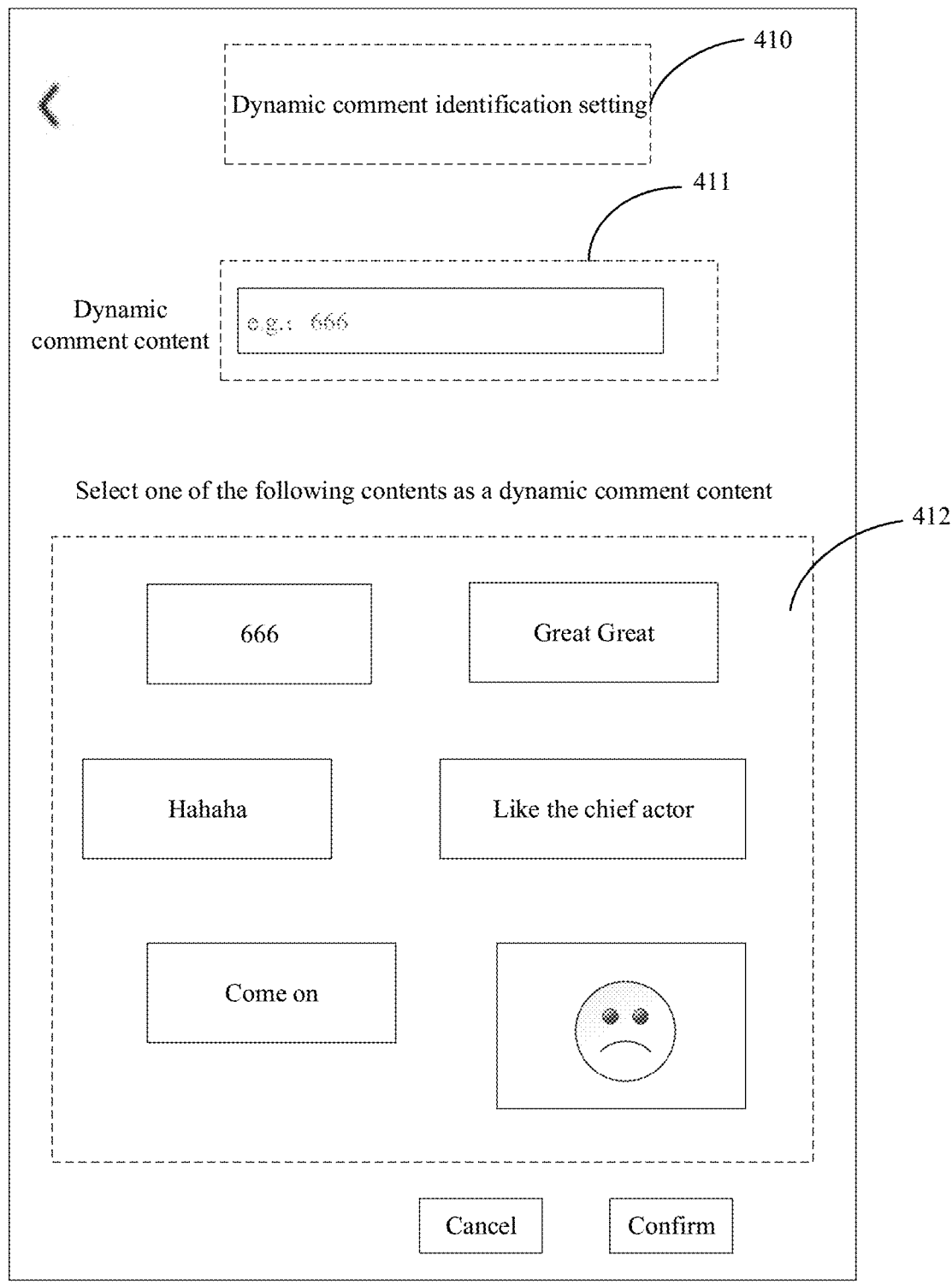
FIG. 4A is a schematic diagram of a setting page of a dynamic comment identification according to an embodiment of the present disclosure.

For example, FIG. 4A is a schematic diagram of a setting page of a dynamic comment identification according to an embodiment of the present disclosure. The title of the setting page may be set as "Dynamic comment guide setting". For example, the title of the setting page is indicated by the reference numeral 410 in FIG. 4A, to facilitate the user to know the page function of the entered page in time. As shown in FIG. 4A, an input box 411 of the dynamic comment content is displayed on the setting page, and an input sample of the dynamic comment content "example: 666" is displayed in the input box 411. The video creator may input customized dynamic comment content in the input box 411. The video processing apparatus may receive the customized dynamic comment content inputted by the video creator, as the dynamic comment content of the dynamic comment identification. It should be noted that the video creator may input one or more dynamic comment contents in the input box 411. When multiple dynamic comment contents are inputted, the dynamic comment contents may be separated by spaces, commas, caesura sign, etc. As shown in FIG. 4A, the setting page is further provided with a candidate dynamic comment content area 412. It can be seen that multiple candidate dynamic comment contents such as "666" and "Come on" are provided on the setting page. A prompt message "Select one of the following contents as the dynamic comment content" is displayed to guide the video creator to select from candidate dynamic comment contents, reducing the cost of editing a dynamic comment content, thus improving the efficiency of adding a dynamic comment identification. The video creator may select at least one target dynamic comment content from the candidate dynamic comment content area 412. The video processing apparatus receives the at least one target dynamic comment content selected by the video creator as the dynamic comment content of the dynamic comment identification.

Figure 4B:
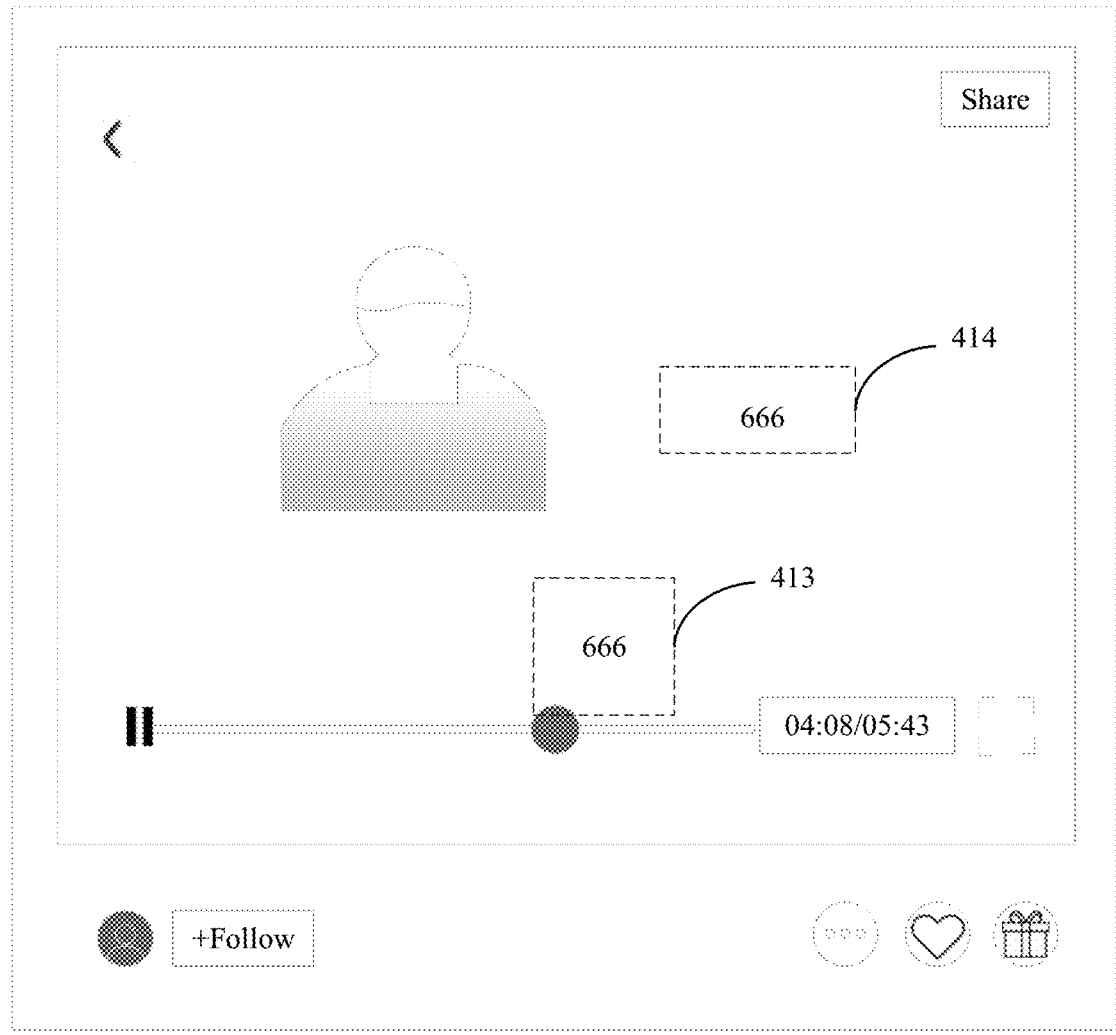
FIG. 4B is a schematic diagram of a process for displaying a dynamic comment identification in the process of playing the video according to an embodiment of the present disclosure.

In this example, it is assumed that the dynamic comment content inputted by the video creator is "666". After receiving the dynamic comment content "666", the video processing apparatus may add the dynamic comment identification including the dynamic comment content "666" to the video to be processed, to display the dynamic comment identification in the process of playing the video. It should be noted that the dynamic comment content corresponding to the dynamic comment identification may be displayed in the video together with the dynamic comment identification, to facilitate the video viewer to know the dynamic comment content corresponding to the dynamic comment identification. Alternatively, the dynamic comment content corresponding to the dynamic comment identification may not be displayed with the dynamic comment identification to maintain a mystique. FIG. 4B is a schematic diagram of a process for displaying a dynamic comment identification in a process of playing the video according to an embodiment of the present disclosure. As shown in FIG. 4B, in the process of playing the video, a dynamic comment identification indicated by a reference number 413 is displayed near the progress bar, and this dynamic comment identification includes the dynamic comment content "666". If the video viewer wants to send a dynamic comment, he may click "666" indicated by the reference number 413. In response to the click operation, the dynamic comment corresponding to the dynamic comment content is displayed on the video playing interface, such as the dynamic comment "666" indicated by the reference number 414 in FIG. 4B.

The target dynamic comment content selected by the user from the candidate dynamic comment contents is received as the dynamic comment content and/or the customized dynamic comment content inputted by the user is received as the dynamic comment content, to improve the flexibility of setting the dynamic comment content. The dynamic comment content is set, and a dynamic comment identification including the dynamic comment content is added to the video to be posted. Thus, when the video viewer triggers the dynamic comment identification displayed on the video playing interface, the dynamic comment corresponding to the dynamic comment content may be displayed on the video playing interface, without the video viewer manually editing the dynamic comment content, reducing the cost of posting a dynamic comment and improving the user experience.

Further, in an embodiment, a content setting condition of the dynamic comment content may be preset. After the customized dynamic comment content inputted by the video creator through the setting page is received, it is detected whether the customized dynamic comment content meets the content setting condition. When the customized dynamic comment content does not meet the content setting condition, a preset prompt message may be displayed to modify the customized dynamic comment content.

For example, the content setting condition may be that the number of words in the dynamic comment content does not exceed 10. After receiving the customized dynamic comment content inputted by the video creator through the setting page, the video processing apparatus may counts the number of words in the customized dynamic comment content. If the number of words in the customized dynamic comment content exceeds 10, the prompt message "Input up to 10 words, please re-edit dynamic comment content" may be displayed to prompt the video creator to re-input a dynamic comment content with no more than 10 words.

In an embodiment, the setting information inputted by the video creator through the setting page may include the dynamic comment title. In this case, the receiving at least one piece of setting information inputted through the setting page, and adding the dynamic comment identification to the video to be posted based on the at least one piece of setting information, to display the dynamic comment identification based on the at least one piece of setting information in the process of playing the video, includes: receiving the dynamic comment title inputted through the setting page, where the dynamic comment identification added to the video to be posted includes the dynamic comment title, and the dynamic comment identification including the dynamic comment title is displayed in the process of playing the video. By receiving the dynamic comment title inputted through the setting page, and adding the dynamic comment identification including the dynamic comment title to the video to be posted, the video viewer may understand the purpose of the dynamic comment identification, and video viewer may be guided to send a dynamic comment in the process of watching the video.

In an embodiment, the setting information inputted by the video creator through the setting page may include the dynamic comment title and the dynamic comment content. In this case, the receiving at least one piece of setting information inputted through the setting page, and adding the dynamic comment identification to the video to be posted based on the at least one piece of setting information, to display the dynamic comment identification based on the at least one piece of setting information during the process of playing the video, includes: receiving the dynamic comment title and dynamic comment content inputted through the setting page, where the dynamic comment identification added to the video to be posted includes the dynamic comment title and dynamic comment content, and the dynamic comment identification including the dynamic comment title and dynamic comment content is displayed in the process of playing the video.

Figure 5A:
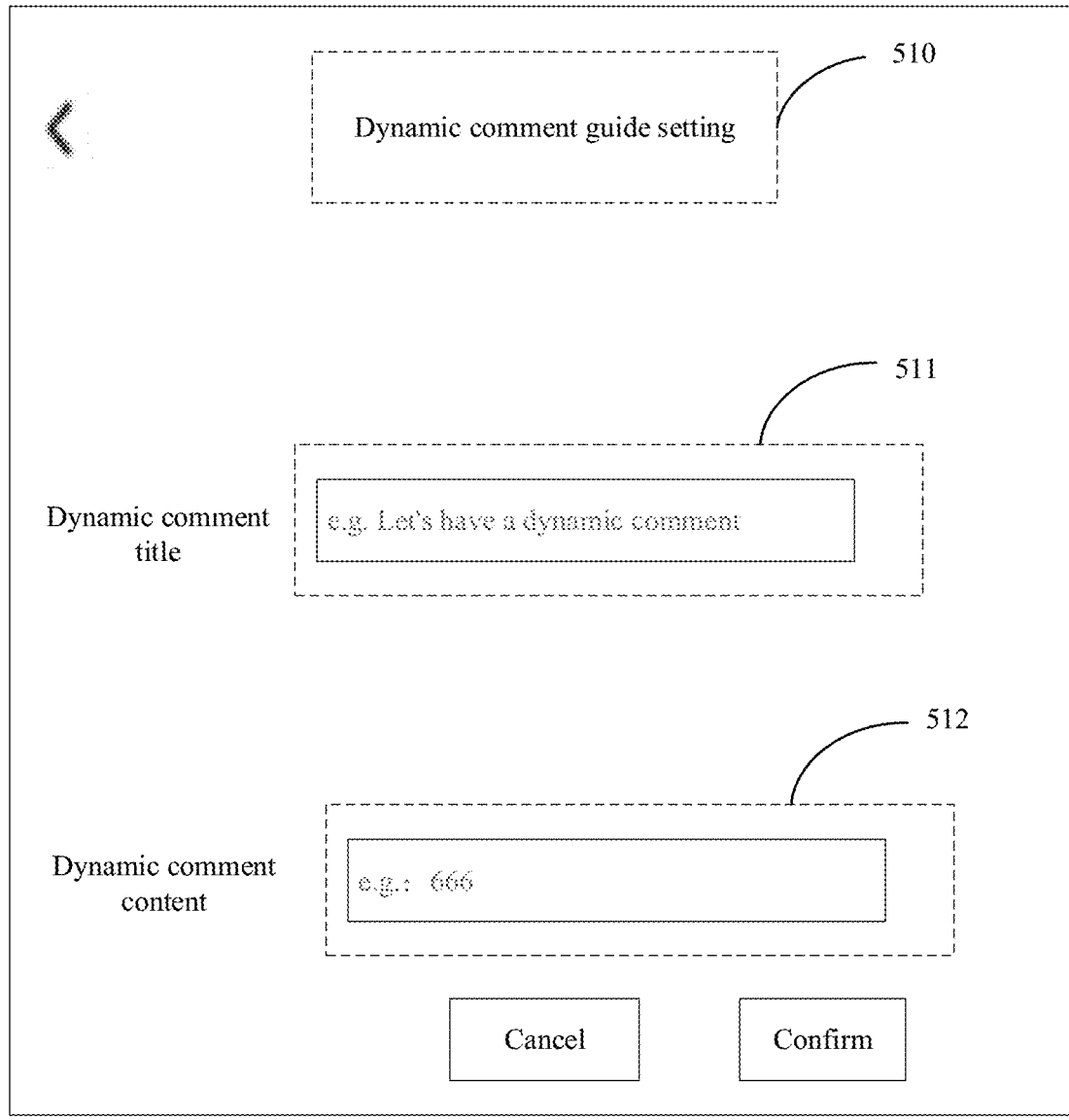
FIG. 5A is a schematic diagram of a setting page of a dynamic comment identification according to another embodiment of the present disclosure.
Figure 5B:
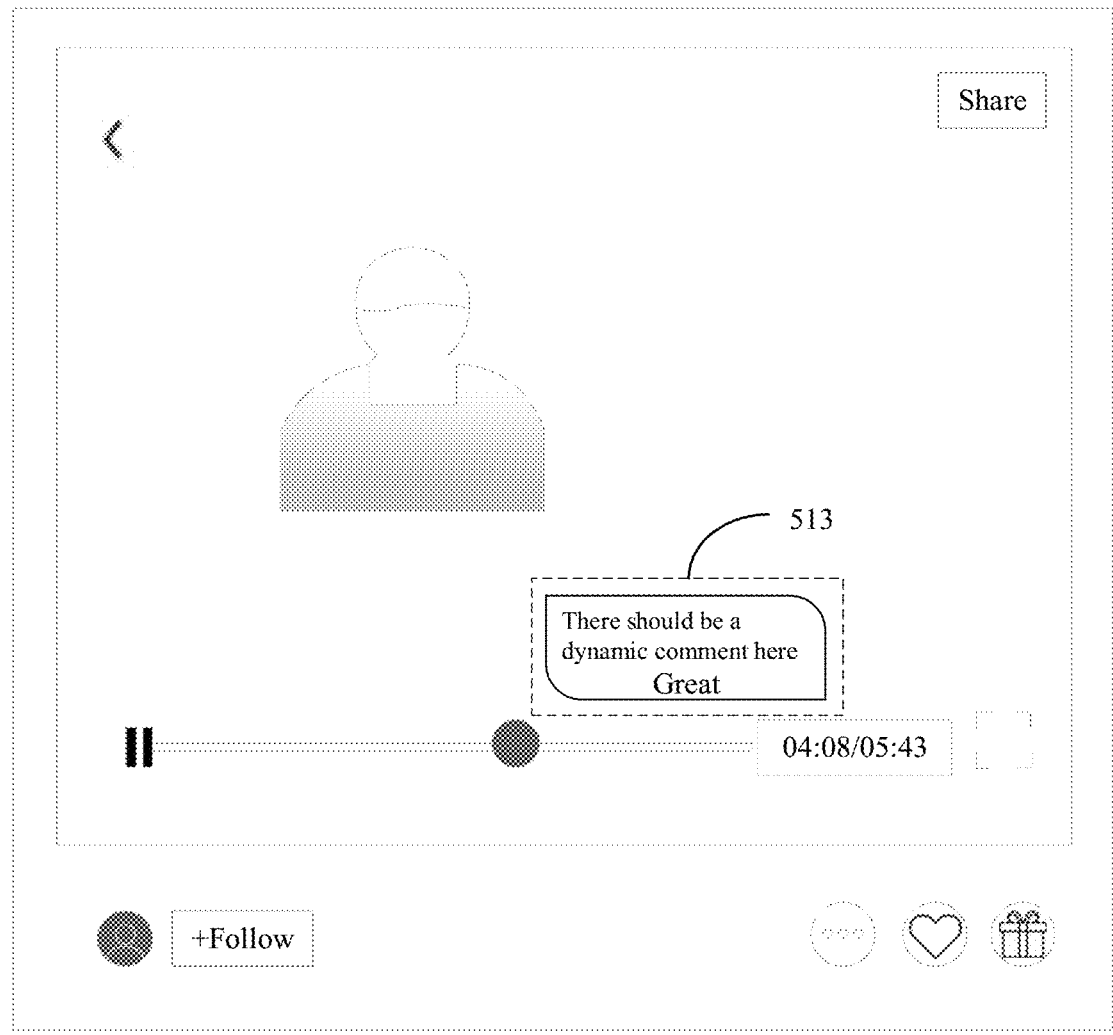
FIG. 5B is a schematic diagram of a result of adding a dynamic comment identification according to an embodiment of the present disclosure.

For example, FIG. 5A is a schematic diagram of a setting page of a dynamic comment identification according to another embodiment of the present disclosure. The title of the setting page may be set to "Dynamic comment guide setting". For example, the title of the setting page may be indicated by a reference numeral 510 in FIG. 5A, to facilitate the user to know the page function of the entered page in time. As shown in FIG. 5A, the setting page is provided with an input box 511 for inputting a dynamic comment title and an input box 512 for inputting a dynamic comment content. A sample of the dynamic comment title, i.e. "Example: let's send a dynamic comment" is displayed in the input box 511, to guide the video creator to input a dynamic comment title of a dynamic comment identification through the input box 511. An input sample of the dynamic comment content, i.e. "Example: 666" is displayed in the input box 512, to guide the video creator to input a dynamic comment content through the input box 512. For example, the dynamic comment title inputted by the video creator through the input box 511 is "There should be a dynamic comment here", and the dynamic comment content inputted through the input box 512 is "Amazing". In this case, the dynamic comment title added to the video to be posted is "There should be a dynamic comment here", and the dynamic comment content is "Amazing", such as the dynamic comment identification indicated by the reference number 513 in FIG. 5B.

Figure 5C:
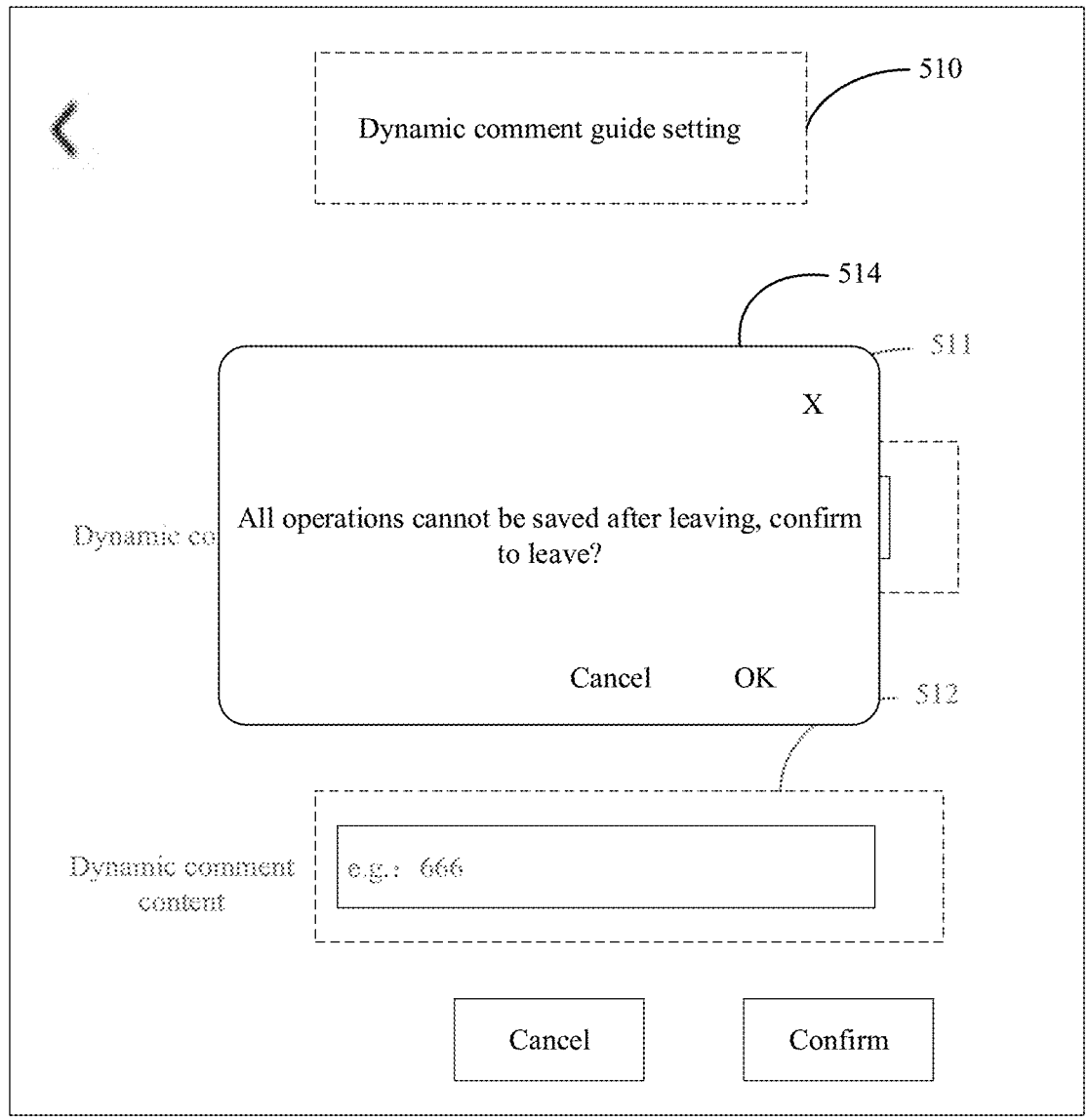
FIG. 5C is a schematic diagram of a pop-up window prompt message in a setting page.

In addition, if the video creator clicks the button "Cancel" on the setting page shown in FIG. 5A, a prompt message "All operations cannot be saved after leaving, confirm to leave?" is displayed in a pop-up window, as shown by the reference number 514 in FIG. 5C. If the video creator clicks the button "Confirm" in the pop-up window, the setting page may be closed. If the video creator clicks the button "Cancel" in the pop-up window, or click the cross "X" in the upper right corner of the pop-up window, it will return to the setting page as shown in FIG. 5A. If the video creator clicks the button "OK" on the setting page shown in FIG. 5A and the video creator has not yet input the dynamic comment title and/or the dynamic comment content at this time, a prompt message "The dynamic comment title cannot be empty" may be displayed in red font below the input box 511, and a prompt message "The dynamic comment content cannot be empty" may be displayed in red font below input box 512, to prompt the video creator to input the dynamic comment title and/or the dynamic comment content. If the video creator has inputted the qualified dynamic comment title and dynamic comment content, when the button "OK" is clicked, the dynamic comment identification including the dynamic comment title and dynamic comment content will be displayed in the video to be posted, where the dynamic comment content may be not shown to bring the mystique.

Further, in an embodiment, a title setting condition of the dynamic comment title may be preset. After the dynamic comment title inputted by the video creator through the setting page is received, it is detected whether the dynamic comment title meets the title setting condition. If the title setting condition is not met, a preset prompt message is displayed to modify the dynamic comment title.

For example, the title setting condition may be that the number of words in the title does not exceed 8 words. After receiving the dynamic comment title inputted by the video creator through the setting page, the video processing apparatus may count the number of words in the dynamic comment title. If the number of words in the dynamic comment title exceeds 8 words, a prompt message "Up to 8 words can be inputted, please re-edit the dynamic comment title" is displayed to prompt the video creator to re-input the dynamic comment title with no more than 8 words.

In an embodiment, the setting information inputted by the video creator through the setting page may also include a display duration of the dynamic comment identification. In this case, the receiving at least one piece of setting information inputted through the setting page, and adding the dynamic comment identification to the video to be posted based on the at least one piece of setting information, to display the dynamic comment identification based on the at least one piece of setting information in the process of playing the video, includes: receiving the display duration of the dynamic comment identification inputted through the setting page, to display the dynamic comment identification in the process of playing the video based on the display duration. By receiving the display duration of the dynamic comment identification, the dynamic comment identification may be displayed in the process of playing the video based on the display duration of the dynamic comment identification. Thus, the display duration of the dynamic comment identification in the video can be controlled flexibly, improving the flexibility of displaying the dynamic comment identification.

For example, the receiving the display duration of the dynamic comment identification inputted through the setting page, to display the dynamic comment identification in the process of playing the video based on the display duration, may include: receiving a start time and an end time inputted through the setting page, to display the dynamic comment identification in the process of playing the video during a playing period from the start time to the end time.

In an embodiment, the start time inputted through the setting page should not later than the total duration of the video to be posted, and the end time should be later than the start time. For example, assuming that the total duration of the video to be posted is 45 seconds, the inputted start time should not be later than 45 seconds, and the inputted end time should be later than the start time. If the end time is later than 45 seconds, the dynamic comment identification will be displayed from the start time until the video ends. When the inputted start time is later than the total duration of the video to be posted, an error message "The start time of the dynamic comment identification cannot be later than the total duration of the video" may be displayed to prompt the video creator to re-input the start time.

For example, the total duration of the video to be posted is 45 seconds, and the video creator inputs a start time of 12 seconds and an end time of 20 seconds through the setting page. In this case, the dynamic comment identification will start to be displayed when the video to be posted is played to 12 seconds, and the dynamic comment identification is displayed continually until the video to be posted is played to 20 seconds.

For example, the receiving the display duration of the dynamic comment identification inputted through the setting page, to display the dynamic comment identification in the process of playing the video based on the display duration may include: receiving a start time and a duration inputted through the setting page, to display the dynamic comment identification in the process of playing the video from the start time and keep displaying the dynamic comment identification in a period corresponding to the duration.

In an embodiment, the sum of the start time and the duration should not be greater than the total duration of the video to be posted. If the sum of the start time and the duration is greater than the total duration of the video to be posted, an error message "The duration of the dynamic comment identification should not exceed the total duration of the video" will be displayed to prompt the video creator to re-input the duration.

For example, the video creator inputs a start time of 12 seconds and a duration of 10 seconds through the setting page. In this case, the dynamic comment identification will start to be displayed when the video to be posted is displayed to 12 seconds and will end after lasting for 10 seconds.

For example, the receiving the display duration of the dynamic comment identification inputted through the setting page, to display the dynamic comment identification in the process of playing the video based on the display duration may include: receiving a start time inputted through the setting page, and determining a duration based on the start time and an end time of the video, to display the dynamic comment identification in the process of playing the video from the start time and keep displaying the dynamic comment identification in the period corresponding to the duration.

In this example, in a process of determining the duration, a remaining duration from the inputted start time to the end time of the video may be calculated and compared with a preset duration threshold. If the remaining duration is greater than or equal to the duration threshold, the duration threshold is set as the duration. If the remaining duration is less than the duration threshold, the remaining duration is set as the duration.

For example, the total duration of the video to be posted is 45 seconds, the start time inputted through the setting page is 30 seconds, and the preset duration threshold is 10 seconds. In this case, the remaining duration from the start time to the end time of the video is 15 seconds, which is greater than the duration threshold of 10 seconds. Thus, the duration may be set as the duration threshold of 10 seconds.

In an embodiment, at least one time edit box of the start time, end time, and duration may be displayed on the setting page, to receive at least one piece of time information of the start time, end time, and duration inputted through the time edit box, or a combination of multiple pieces of time information.

In an embodiment, a preview window of the video to be posted may be displayed on the setting page, and a drag operation on a progress bar of the preview window may be received to set the start time based on a dragging start position of the progress bar, and set the end time based on a drag end position of the progress bar.

In an embodiment, on the setting page, not only the time edit boxes corresponding to the start time, the end time, and the duration may be displayed, but also the preview window of the video to be posted may be displayed. The video creator may select to input at least one of the start time, the end time, and the duration according to his own habits, and may also set the start time and end time by dragging the progress bar in the preview window.

Figure 6:
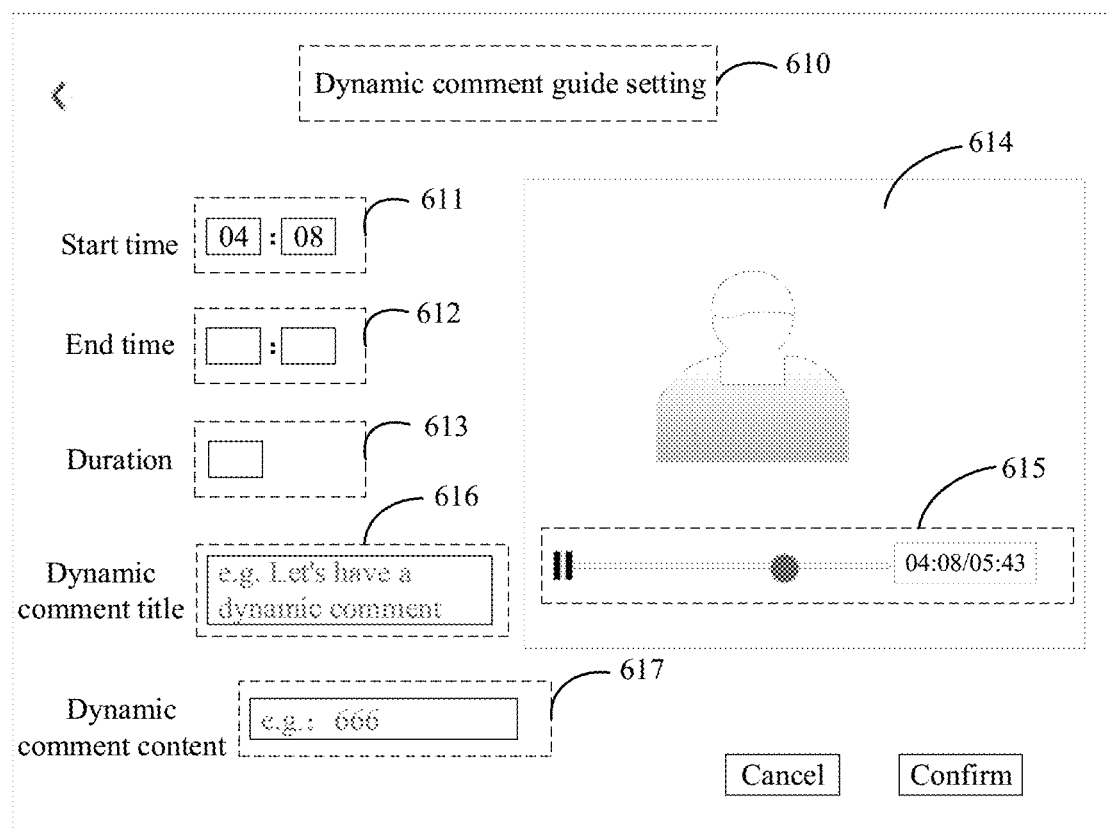
FIG. 6 is a schematic diagram of a setting page of a dynamic comment identification according to another embodiment of the present disclosure.

For example, FIG. 6 is a schematic diagram of a setting page of a dynamic comment identification according to another embodiment of the present disclosure. The title of the setting page may be set as "Dynamic comment guide setting". For example, the title of the setting page is indicated by a reference numeral 610 in FIG. 6, to facilitate the user to know the page function of the entered page in time. As shown in FIG. 6, the setting page is provided with a start time input box 611, an end time input box 612 and a duration input box 613. The user may input at least one of the start time, the end time and the duration through the input boxes. The start time, the end time and the duration is in units of seconds. The start time and end time may be kept in two digits. For example, the start time in FIG. 6 may be set to 04:08 second.

As shown in FIG. 6, a preview window 614 is further set in the setting page. The preview window 614 is used to play the currently video to be posted and display the progress bar 615 of the current video to be posted, so that the video creator can preview the current video to be posted. An initial playing state of the preview window 614 is a paused state. Only the cover of the video is displayed, and the current video to be posted is not played. If the user triggers the control "Start play", the current video to be posted will start to be played in the preview window 614, and the progress of the video will be displayed by the progress bar. The video playing interface at different moments of the video may be previewed by changing the playback progress position of the progress bar. If the video creator manually drags the progress bar of the current video to be posted to a specific position based on the preview window 614, the dragging start position is set as the start time and the drag end position is set as the end time. The video processing apparatus may automatically fill in the start time and end time determined based on the drag operation of the video creator on the progress bar into the start time input box 611 and the end time input box 612. The start time and end time is determined by dragging the progress bar, without video creator manually inputting the start time and end time, which improves the convenience of determining the display duration of the dynamic comment identification, improving the efficiency of adding the dynamic comment identification.

In an embodiment, the setting information inputted by the video creator through the setting page may include a display template and/or a display position of the dynamic comment identification. In this case, the receiving at least one setting information inputted through the setting page, and adding a dynamic comment identification to the video to be posted based on the at least one setting information, to display the dynamic comment identification based on the at least one setting information in the process of playing the video, includes: receiving the display template and/or the display position of the dynamic comment identification inputted through the setting page, to display the dynamic comment identification based on the display template and/or the display position in the process of playing the video. In this way, the display form and display position of the dynamic comment identification in the video can be enriched, and the visual effect can be improved.

For example, if the video creator only sets the display template of the dynamic comment identification, the dynamic comment identification may be displayed based on the display template in the process of playing the current video to be posted, and the display position of the dynamic comment identification is not limited (in this case, a position preset by the system may be used). If the video creator only sets the display position of the dynamic comment identification, the dynamic comment identification may be displayed at the display position in the process of playing the current video to be posted, and the display template of the dynamic comment identification is not limited (in this case, a template preset by the system may be used). If the video creator sets both the display position and display template of the dynamic comment identification, the dynamic comment identification may be displayed at the display position based on the display template in the process of playing the current video to be posted. In this way, the diversity of interaction is enriched, and the user experience is improved.

In an embodiment, the video creator may select, from a preset dynamic comment identification template library, his favorite display template, such as a dynamic comment identification display template with a red background, a dynamic comment identification display template with a circular shape. When the video creator inputs multiple dynamic comment contents, the display template may also be in the display form of multiple dynamic comment contents displaying in the dynamic comment identification. For example, multiple dynamic comment contents are displayed side by side, or four dynamic comment contents are displayed in a grid shape. The display position refers to a display position of the dynamic comment identification in the video playback area or the video playing interface. Specifically, the display position may be at the upper right corner or the lower right corner of the video playback area to facilitate the trigger operation of the video viewer. The display position is set in consideration that most users are accustomed to perform some trigger operations using their right hands. The display position may also be set in the middle of the video playback area to attract the attention of video viewer to the greatest extent, so that video viewer can see the dynamic comment identification, and are guided to trigger the dynamic comment identification, to increase the number of dynamic comments in the video.

Further, in a possible embodiment, the receiving the display position of the dynamic comment identification inputted through the setting page includes: displaying a preview window of the video to be posted on the settings page, where the dynamic comment identification is displayed on the video playing interface of the preview window; and receiving a drag operation on the dynamic comment identification, and determining the display position of the dynamic comment identification based on an end position of the dragging operation.

That is, after the video creator has added the dynamic comment identification at a certain position of the video playing interface, the preview window of the setting page may display the dynamic comment identification added on the video playing interface, to facilitate the video creator to preview the added effect of the dynamic comment identification. If the video creator is not satisfied with the current display position of the dynamic comment identification, the video creator may drag the dynamic comment identification to a desired display position on the video playing interface. The video processing apparatus receives and responds to the dragging operation, determines the end position of the drag operation as the display position of the dynamic comment identification, and displays the dynamic comment identification at the end position. By receiving the drag operation on the dynamic comment identification, the display position of the dynamic comment identification is determined based on the end position of the drag operation, so that the video creator may flexibly adjust the display position of the dynamic comment identification by dragging the dynamic comment identification, which is convenient to change the display position of the dynamic comment identification, improving the efficiency of adding the dynamic comment identification.

In an embodiment, the setting information inputted by the video creator through the setting page of the dynamic comment identification may include a dynamic comment display style. In this case, the receiving at least one piece of setting information inputted through the setting page, and adding a dynamic comment identification to the video to be posted based on the at least one piece of setting information, to display the dynamic comment identification based on the at least one piece of setting information during the process of playing the video, includes: receiving the dynamic comment display style set through the setting page, where the dynamic comment display style includes: a font style for displaying a dynamic comment on a video screen, and/or an animation style of the dynamic comment.

For example, if the video creator only sets the font style for displaying the dynamic comment, when a dynamic comment is sent by triggering the dynamic comment identification during the display of the video interface, the dynamic comment content may be displayed based on the set font style, and the animation style of the dynamic comment is not limited (in this case, an animation style preset by the system may be used). If the video creator only sets the animation style of the dynamic comment, when the dynamic comment is sent by triggering the dynamic comment identification during the display of the video interface, the dynamic comment content may be displayed based on the set animation style of the dynamic comment, and the font style of the dynamic comment is not limited (in this case, a font preset by the system may be used). If the video creator sets both the animation style and font style of the dynamic comment, when the dynamic comment is sent by triggering the dynamic comment identification during the display of the video interface, the dynamic comment content may be displayed based on the set font style and the animation style of the dynamic comment. Thus, the display style of the dynamic comment is enriched, improving the visual experience of the user.

For example, the video creator may select his favorite font style from a preset font library, such as selecting the font style of dynamic comment as red highlight, artistic word style. The video creator may select his favorite animation style from a preset animation style library, such as flashing, jumping, easter eggs.

Further, in a possible embodiment, the preview window of the video to be posted may be displayed on the setting page of the dynamic comment identification. In response to a preview operation of playing the video to be posted in the preview window, the dynamic comment identification including the dynamic comment content is displayed within a playing period corresponding to the display duration. In response to the trigger operation on the dynamic comment identification, the dynamic comment content is displayed on the currently played video screen based on the font style and/or the animation style of the dynamic comment.

In the embodiment of the present disclosure, the dynamic comment identification added to the video playing interface supports preview. The video creator may watch the effect of adding the dynamic comment identification in the video playing interface through the preview window provided on the setting page. The initial state of the video to be posted in the preview window may be a paused playback state. When the video creator triggers the control "Start playing", the preview operation of the video to be posted is triggered. In response to the preview operation, the preview window starts to play the video to be posted, and displays the dynamic comment identification when the video screen added with the dynamic comment identification is displayed. The dynamic comment identification will be displayed within a playing period corresponding to the display duration. Alternatively, in response to the preview operation, the preview window may directly jump to a video playback progress at the video interface added with the dynamic comment identification to play the video interface, and displays the dynamic comment identification including the dynamic comment content within the playing period corresponding to the display duration. If the video creator performs a trigger operation on the dynamic comment identification in the video playing interface displayed in the preview window, the dynamic comment content corresponding to the dynamic comment identification may be displayed in the current video playing interface, in response to the trigger operation. The dynamic comment content may be displayed based on the preset font style and/or the animation style of the dynamic comment.

For example, if the font style is preset as an artistic font, the dynamic comment content will be displayed on the video playing interface in an artistic font. If the animation style of the dynamic comment is preset to be flashing, the dynamic comment content will be displayed in a flashing manner on the video playing interface. If the font style is preset as artistic font and the dynamic comment animation style is preset as flashing, the dynamic comment content will be displayed in the video playing interface in an artistic font and in a flashing manner.

Figure 7A:
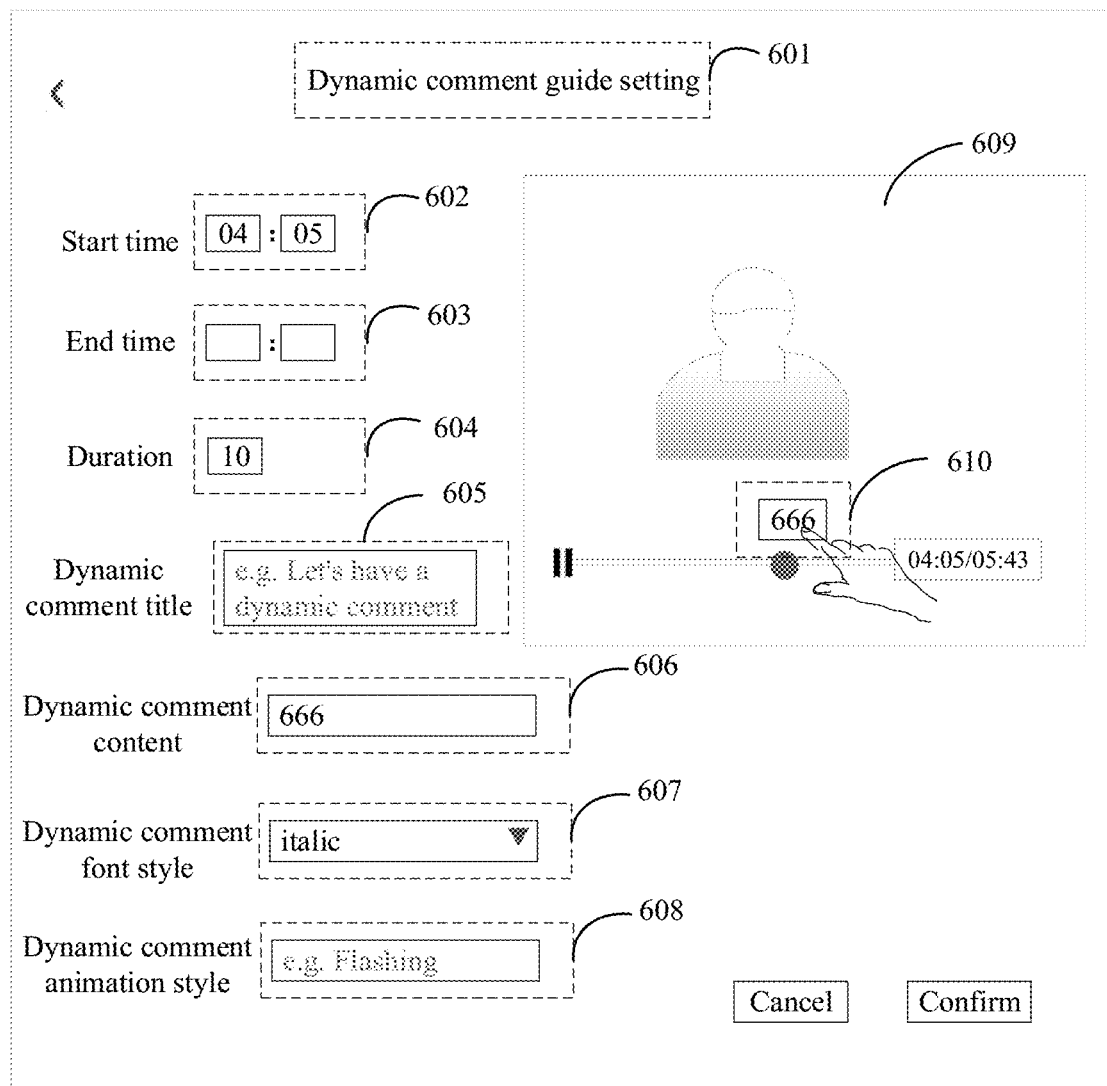
FIG. 7A is a schematic diagram of a setting page of a dynamic comment identification according to another embodiment of the present disclosure.
Figure 7B:
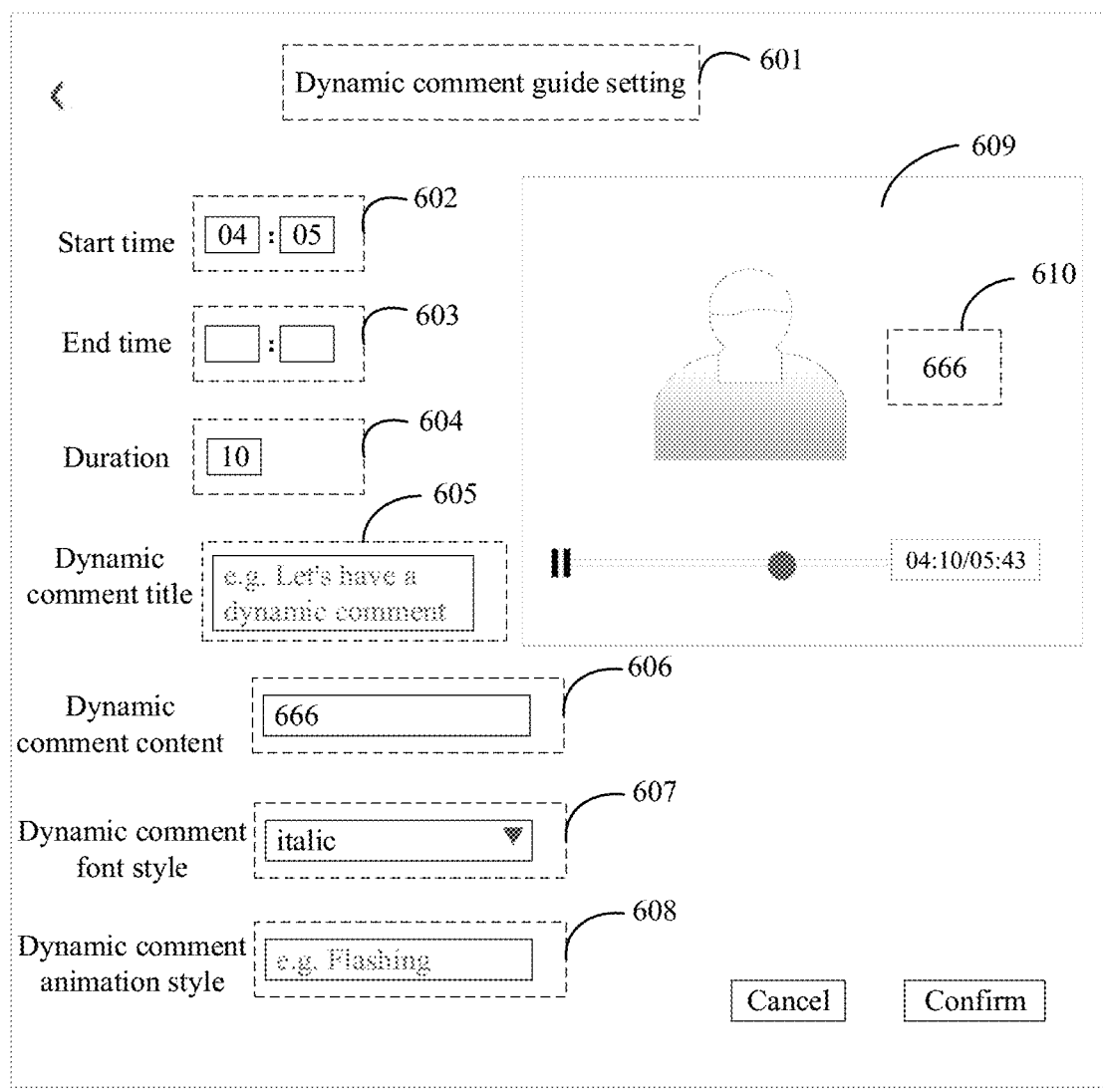
FIG. 7B is a schematic diagram of a process for displaying a dynamic comment in a preview window of the setting page according to an embodiment of the present disclosure.

For example, FIG. 7A is a schematic diagram of a setting page of a dynamic comment identification according to another embodiment of the present disclosure. The title of the setting page may be set as "dynamic comment guide setting". For example, the title of the setting page may be indicated by the reference number 601 in FIG. 7A, to facilitate the user to know the page function of the entered page in time. As shown in FIG. 7A, the setting page includes a start time edit box 602, an end time edit box 603, a duration edit box 604, a dynamic comment title input box 605, a dynamic comment content input box 606, and a dynamic comment font style edit box 607, a dynamic comment animation style edit box 608, and a preview window 609. As shown in FIG. 7A, the start time of the dynamic comment identification inputted by the video creator through the setting page is 04:05 second, the duration is 10 seconds, the dynamic comment content is "666", and the font style of the dynamic comment is "italic". When the video creator previews the video to be posted with the dynamic comment identification through the preview window, the dynamic comment identification with the dynamic comment content of "666" will be displayed on the video playing interface from the time that the video is played to 04:05 second, e.g. the dynamic comment identification indicated by a reference number 610 in FIG. 7A, and is displayed for 10 seconds. If the video creator clicks on the dynamic comment identification 610 in the preview window, the dynamic comment content "666" corresponding to the dynamic comment identification will be displayed in italics in the video playing interface, e.g. the dynamic comment indicated by a reference number 600 in FIG. 7B.

Further, in a possible embodiment, the dynamic comment display style further includes: setting an animation style of the dynamic comment and a corresponding dynamic comment sending times threshold.

Specifically, the dynamic comment sending times threshold may be set by the video creator, for example, 30, 50, or may be a default value. For example, the default value may be 66.

In an embodiment of the present disclosure, the video creator may set the dynamic comment sending times threshold and the corresponding animation style of the dynamic comment, when the number of times for sending the same dynamic comment reaches the threshold, the animation style of the dynamic comment is displayed.

For example, it is assumed that the dynamic comment sending times threshold is set to 66 times, and the corresponding animation style of the dynamic comment is setting off fireworks. When the video viewer consecutively sends the dynamic comment through the dynamic comment identification displayed in the video playing interface for 66 times, fireworks is set off in the video playing interface. In this way, the dynamic comment style is further enriched and the visual experience is improved.

In an embodiment, when the display position of the dynamic comment identification on the video playing interface coincides with the display position of a setting identification on the video playing interface, the display position of the dynamic comment identification on the video playing interface is adjusted, or the setting identification is controlled to be displayed below the dynamic comment identification. In this case, the display priority of the dynamic comment identification is higher than that of the setting identification. The setting identification may be, for example, an identification of a shopping cart.

It should be noted that the setting page in the embodiment of the present disclosure may include input boxes corresponding to information such as the dynamic comment title, the dynamic comment content, the start time, the end time, the duration, the display position, the display template, the dynamic comment display style. The video creator may selectively input one or more pieces of setting information to set the dynamic comment identification according to actual needs, and the system default setting may be used for information not set by the video creator. For example, in FIG. 6, the setting page further includes a dynamic comment title input box 616 and a dynamic comment content input box 617. An asterisk "*" may be set near the input box, and prompt the video creator which information must fill in through the prompt message "The item added with * is required", to help the video creator set setting information corresponding to the dynamic comment identification.

In the video processing method of the embodiment of the present disclosure, the trigger operation of the dynamic comment control associated with the video to be posted is received. In response to the trigger operation, the setting page of the dynamic comment identification is displayed. At least one piece of setting information inputted through the setting page is received. A dynamic comment identification is added to the video to be posted based on the at least one piece of setting information, to display the dynamic comment identification based on the at least one piece of setting information in the process of playing the video. With the above technical solution, the video creator can set the relevant information of the dynamic comment identification actual needs, to add a customized dynamic comment identification in the video playing interface, realizing the personalized setting of the dynamic comment identification, improving the user experience.

Figure 8:
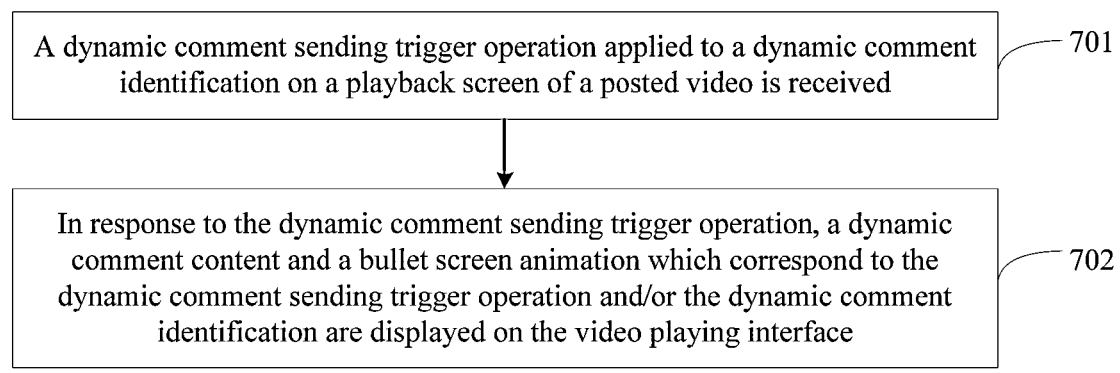
FIG. 8 is a flow chart of a video processing method according to yet another embodiment of the present disclosure.

FIG. 8 is a schematic flowchart of a video processing method according to another embodiment of the present disclosure. On the basis of the above-mentioned embodiments, an implementation of triggering the dynamic comment identification displayed in the video playing interface to send the dynamic comment in a one-click way. Specifically, the implementation includes: in response to a trigger operation of the dynamic comment identification, the corresponding dynamic comment content and dynamic comment animation is displayed on the video playing interface.

As shown in FIG. 8, the video processing method may include the following steps 701 to 702.

In step 701, a dynamic comment sending trigger operation applied to a dynamic comment identification on a playing interface of a posted video is received.

In an embodiment of the present disclosure, the video creator described in the foregoing embodiments may also watch videos posted by other users as a video viewer. The video viewer may watch a video through a video application installed on an electronic device such as a smart phone, a tablet computer, and a personal computer. The video may be displayed in any mode, such as a landscape mode, a portrait mode, and a small suspension window mode.

In the process of playing the posted video, when the video screen is played to a position where the dynamic comment identification is added, under the guidance of the dynamic comment identification, the video viewer may perform a dynamic comment sending trigger operation on the dynamic comment identification. The video processing apparatus receives the dynamic comment sending trigger operation.

In step 702, in response to the dynamic comment sending trigger operation, a dynamic comment content and a dynamic comment animation which correspond to the dynamic comment sending trigger operation and/or the dynamic comment identification are displayed on the video playing interface.

The display position of the dynamic comment on the video playing interface may be a dynamic comment display position pre-set by the system, or the dynamic comment display position personalize by the video viewer based on his own preference, which is not limited in this disclosure.

For example, when the dynamic comment sending trigger operation is received only once, a dynamic comment corresponding to the dynamic comment identification will be displayed on the video playing interface, and a posted dynamic comment content is preset by the video creator of the video for the dynamic comment identification. If the video creator has also set a corresponding dynamic comment animation, the dynamic comment content may be displayed in the form of the dynamic comment animation. For example, the video creator sets that the dynamic comment content corresponding to the dynamic comment identification is "666", and the dynamic comment animation is flashing. In this case, when the video viewer triggers the dynamic comment identification displayed in the video playing interface once, the dynamic comment content "666" will be displayed on the video playing interface in an animation style of flashing.

For example, the dynamic comment trigger operation is received more than once, or a trigger duration of the received dynamic comment trigger operation is longer than a preset value. That is, during the current display duration of the dynamic comment identification, the video viewer performs the dynamic comment sending trigger operation on the dynamic comment identification in a consecutive click or long press manner. In response to the dynamic comment sending triggering operation, multiple dynamic comments of the dynamic comment content corresponding to the dynamic comment identification will be displayed on the video playing interface. The number of displayed dynamic comments may be determined based on the number of consecutive clicks on the dynamic comment identification or the duration of the long pressing on the dynamic comment identification. For example, when the consecutive clicks on the dynamic comment identification is performed 10 times, 10 dynamic comments will be sent. When the long pressing lasts for 8 seconds, 8 dynamic comments may be sent. In addition, when a video viewer consecutively sends multiple dynamic comments, only one dynamic comment may be displayed on the video playing interface of other video viewers, to avoid other video viewers from being affected during viewing the video content due to a display of multiple dynamic comments.

Further, the video viewer consecutively performs the dynamic comment sending trigger operation for a certain number of times within the current display duration of the dynamic comment identification, or the trigger duration of long pressing the dynamic comment identification reaches a certain length of time. In this case, if the dynamic comments including the dynamic comment content are sent on the video playing interface, the number of dynamic comments reaching the threshold may affect the viewing experience of the video viewer. In this case, a preset dynamic comment animation (such as an airplane, an Easter egg) may be displayed in the video playing interface, to express the current excitement of the video viewer.

Figure 9A:
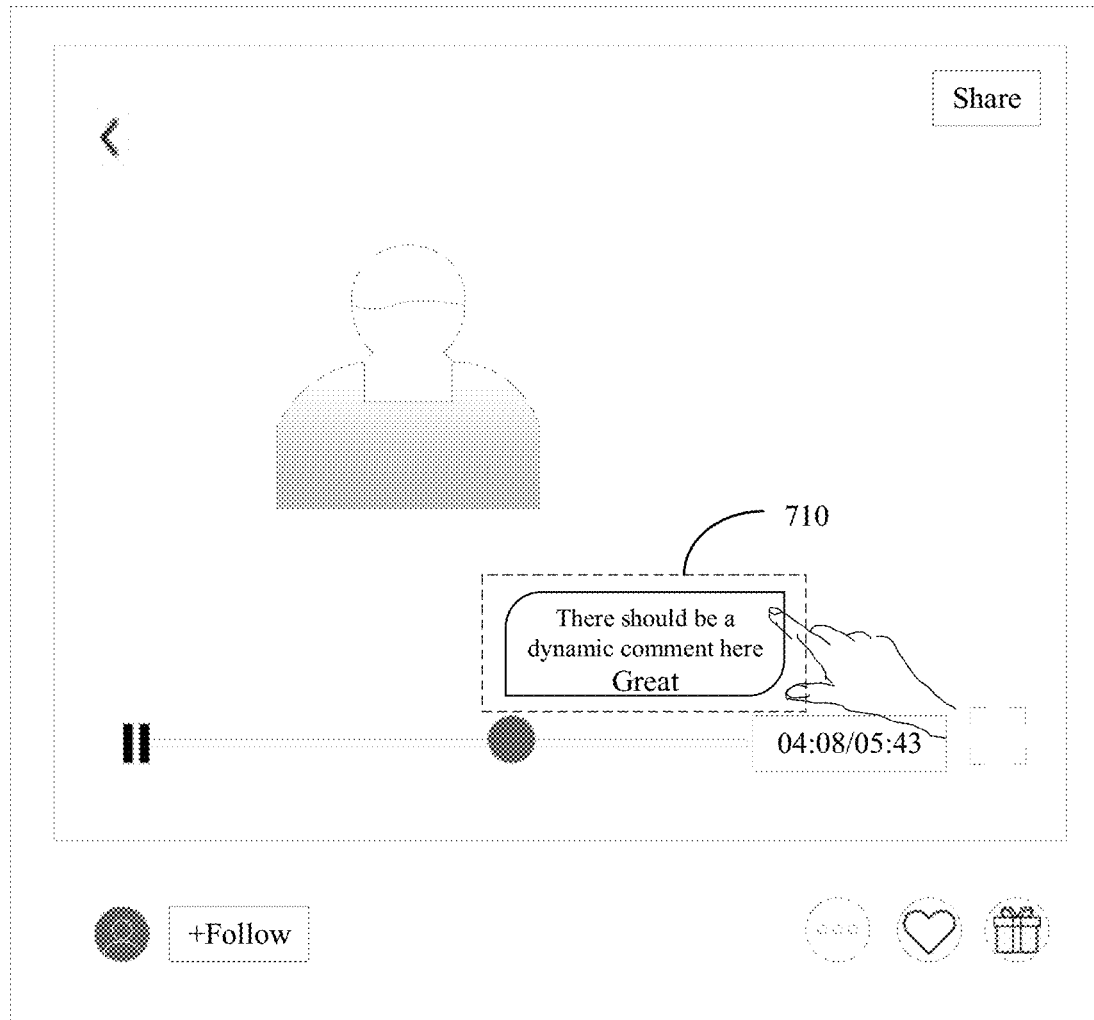
FIG. 9A is a schematic diagram of a dynamic comment identification displaying on a video playing interface.

For example, FIG. 9A is a schematic diagram of a dynamic comment identification displaying on a video playing interface. As shown in FIG. 9A, the dynamic comment identification 710 starts to be displayed when the video is played to 04:08 seconds, the dynamic comment title of the dynamic comment identification is "There should be a dynamic comment here", and the dynamic comment content is "Awesome". It is assumed that the video creator of the video has set an animation effect of displaying an airplane when the number of consecutive clicks on the dynamic comment identification reaches 10 times in the current display duration. When the video viewer clicks on the dynamic comment identification 710, if the video viewer clicks once, the dynamic comment content is displayed in the video playing interface as a dynamic comment with "Awesome", such as the dynamic comment indicated by the reference number 711 in FIG. 9B. If the video viewer consecutively clicks on the dynamic comment identification more than once, but the number of consecutive clicks is less than 10 number of times, a large wave of dynamic comment content "Awesome" will be displayed on the video playing interface, such as the dynamic comment indicated by the reference number 712 in FIG. 9C. If the video viewer consecutively clicks on the dynamic comment identification more than 10 number of times, the airplane will be displayed in the video playing interface, such as the animation indicated by the reference number 713 in FIG. 9D. The animation plane may appear in the form of flying from the bottom to the top of the video playing interface, or flying from the right side to the left side of the video playing interface. FIG. 9D is only an example, which is not a limitation to the present disclosure.

In an embodiment, when the video viewer does not turn on the dynamic comment switch, if the video viewer performs a dynamic comment sending trigger operation on the dynamic comment identification displayed in the video playing interface, the dynamic comment switch is automatically turned on, and a prompt message "The dynamic comment switch has been turned on" is displayed.

In the video processing method according to the embodiments of the present disclosure, the dynamic comment sending trigger operation on the dynamic comment identification of the posted video playing interface is received. In response to the dynamic comment sending trigger operation, the dynamic comment content and dynamic comment animation corresponding to the dynamic comment identification and/or the dynamic comment sending trigger operation are displayed on the video playing interface. With the above technical solution, the video viewer only needs to click on the dynamic comment identification to send the dynamic comment, which can send the dynamic comment in the one-click manner without manually editing the dynamic comment content. Thus, the cost and threshold for sending a dynamic comment are reduced, the efficiency for sending a dynamic comment is improved and the time for sending a dynamic comment is saved, thus improving the integration of the dynamic comment and video content and improving the user experience.

FIG. 10 is a schematic flowchart of a video processing method according to another embodiment of the present disclosure. The method may be performed by the video processing apparatus according to the embodiment of the present disclosure. The apparatus may be implemented by software and/or hardware, and may generally be integrated in an electronic device.

As shown in FIG. 10, the video processing method may include the following steps 111 to 112.

In step 111, a trigger operation on the dynamic comment identification of the video playing interface is received, where dynamic comment content is displayed on the dynamic comment identification.

In step 112, in response to the trigger operation, a dynamic comment corresponding to the dynamic comment content is displayed on the video playing interface.

In an embodiment of the present disclosure, when a video viewer watches a video posted by a video creator, the video playing interface may display a dynamic comment identification pre-added to the video by the video creator, and the dynamic comment content is displayed on the dynamic comment identification. When the video viewer wants to send a dynamic comment, he may perform a trigger operation on the dynamic comment identification displayed on the video playing interface to send the dynamic comment. The video processing apparatus receives the trigger operation, and display the dynamic comment corresponding to the dynamic comment content on the video playing interface in response to the trigger operation.

Figure 9B:
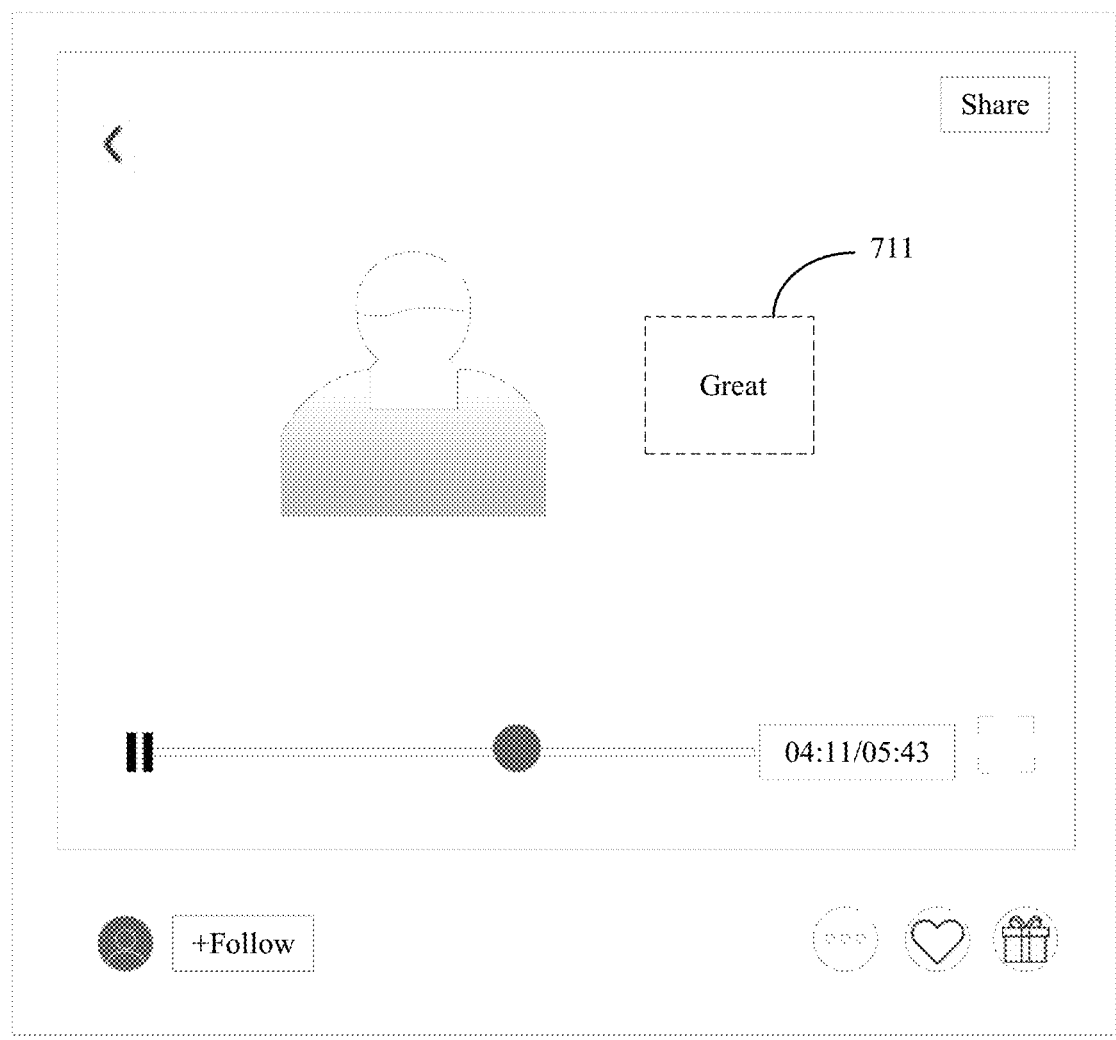
FIG. 9B is a schematic diagram of a dynamic comment displaying on a video playing interface when a corresponding dynamic comment identification is clicked once.
Figure 9C:
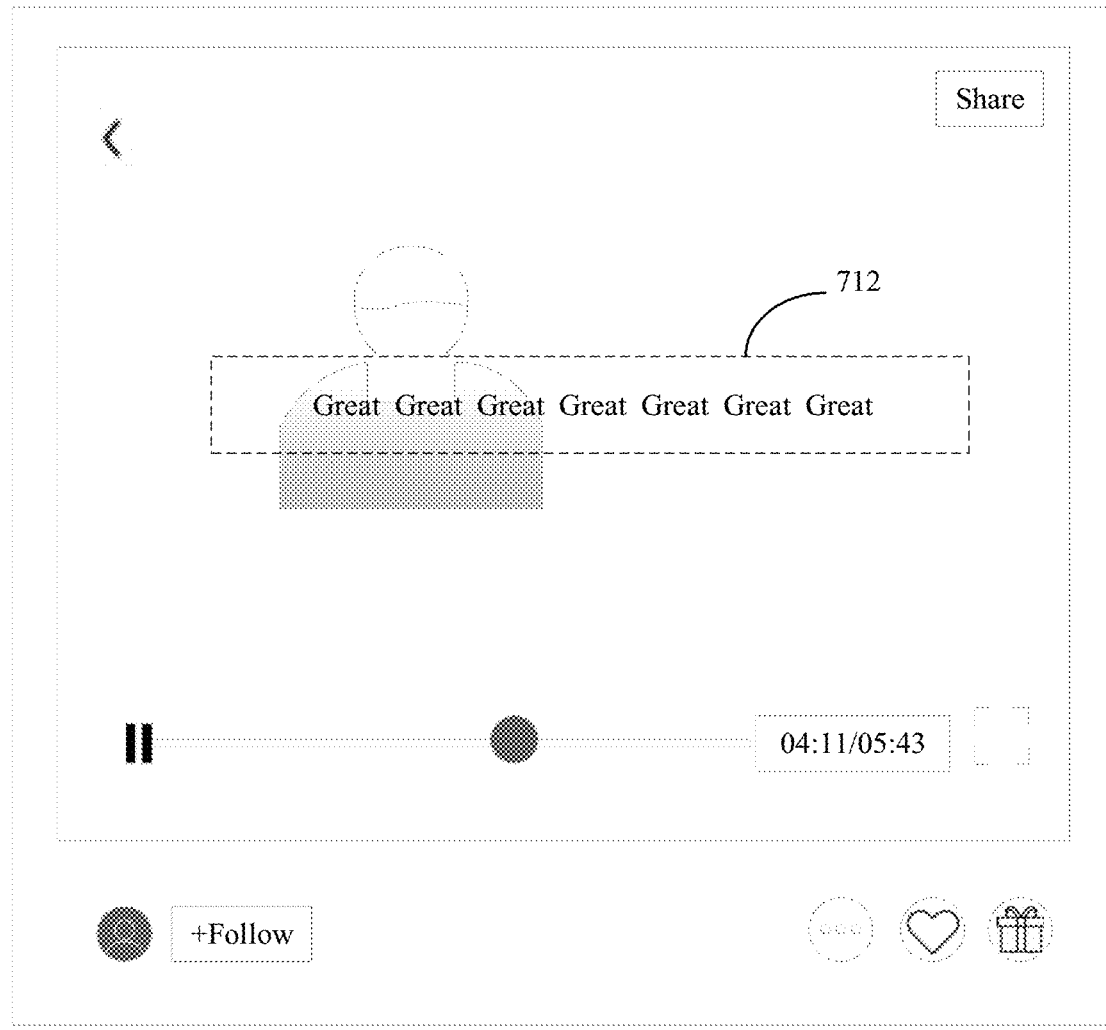
FIG. 9C is a schematic diagram of a dynamic comment displaying on a video playing interface when a corresponding dynamic comment identification is clicked more than once.
Figures 9D, 10:
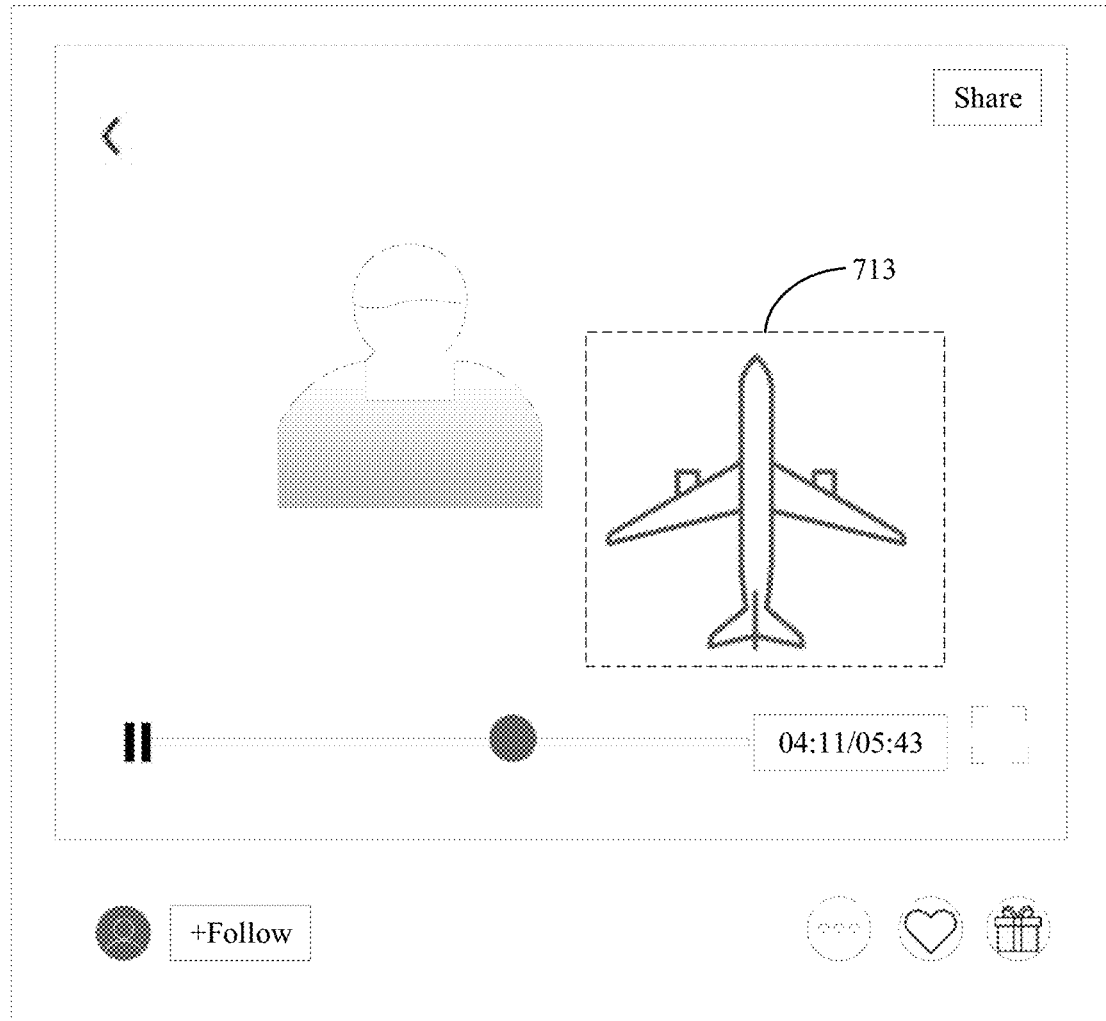
FIG. 9D is schematic diagram of a dynamic comment displaying on a video playing interface when the number of clicks on a corresponding dynamic comment identification exceeds a preset threshold.
FIG. 10 is a flow chart of a video processing method according to another embodiment of the present disclosure.

For example, as shown in FIGS. 9A and 9B, when a video viewer clicks on the dynamic comment identification 710 shown in FIG. 9A, a dynamic comment with the dynamic comment content "Awesome", such as a dynamic comment indicated by the reference numeral 711 in FIG. 9B, is displayed on the video playing interface in response to the click operation.

In the video processing method according to the embodiments of the present disclosure, a trigger operation on the dynamic comment identification of the video playing interface is received, where the dynamic comment content is displayed on the dynamic comment identification. In response to the triggering operation, the dynamic comment corresponding to the dynamic comment content is displayed on the video playing interface. With the above technical solution, the video viewer only needs to click on the dynamic comment identification to send the dynamic comment, which can send the dynamic comment in the one-click manner without manually editing the dynamic comment content. Thus, the cost and threshold for sending a dynamic comment are reduced, the efficiency for sending a dynamic comment is improved and the time for sending a dynamic comment is saved, thus improving the integration of the dynamic comment and video content. Moreover, the dynamic comment content is displayed on the dynamic comment identification, and the dynamic comment sent by triggering the dynamic comment identification corresponds to the dynamic comment content, thereby meeting the user expectation and improving the user experience.

When watching a video, the video viewer may wish to send multiple dynamic comments. For example, when watching an exciting part, the video viewer may wish to send multiple dynamic comments to express his excitement. Therefore, in a possible embodiment, the video processing method further includes: determining a type of the trigger operation; determining the number of dynamic comments displayed on the video playing interface based on the type of the trigger operation; and displaying the dynamic comments corresponding to the number of dynamic comments on the video playing interface.

The type of the trigger operation may include, but not limited to, a single click, a double click, a long press and so on.

In an embodiment of the present disclosure, when a trigger operation on the dynamic comment identification displayed on the video playing interface is received, the type of the trigger operation may be determined. For example, when the click operation is received once within a preset time and the duration of the click is less than a preset duration, it may be determined that the type of the trigger operation is a single click. When multiple single click operations are received within a preset duration, it may be determined that the type of the trigger operation is a consecutive click, and the number of consecutive clicks may be obtained. When a trigger operation is received within a preset time and the duration of the trigger operation exceeds a preset duration, it may be determined that the type of the trigger operation is a long press, and the duration of the long press may be obtained.

Further, based on the type of the trigger operation, the number of dynamic comments displayed on the video playing interface is determined, and the dynamic comments corresponding to the number of dynamic comments is displayed on the video playing interface.

For example, when the type of the trigger operation is determined as a single click, the number of dynamic comments is determined to be 1, one dynamic comment is sent, and a dynamic comment corresponding to the dynamic comment content is displayed on the video playing interface, such as the dynamic comment indicated by a reference number 711 in FIG. 9B. When the type of the trigger operation type is determined to be a consecutive click, it may be determined that the number of dynamic comments is the same as the number of dynamic comments. The dynamic comment corresponding to the dynamic comment content is displayed on the video playing interface, and the number of the displayed dynamic comments is consistent with the number of consecutive clicks. For example, it is assumed that the video viewer clicks the dynamic comment identification 710 shown in FIG. 9A for 7 times, 7 dynamic comments with the dynamic comment content "Awesome" are displayed on the video playing interface, such as the dynamic comment indicated by the reference number 712 in FIG. 9C. When the type of the trigger operation type is determined as a long press, it may be determined that the number of dynamic comments correspond to the duration of the long press. For example, it is assumed that the video viewer presses the dynamic comment identification 710 shown in FIG. 9A for 7 seconds, it may be determined that the type of the trigger operation is a long press, and the duration of the long press is 7 seconds. It may be determined that the number of dynamic comments is 7, and 7 dynamic comments with the dynamic comment content "Awesome" are displayed on the video playing interface, such as the dynamic comment indicated by the reference number 712 in FIG. 9C. For example, when the type of the trigger operation is determined as a long press or when the number of consecutive clicks within a preset duration exceeds a preset number threshold, a maximum preset number of dynamic comments will be sent. The maximum preset number is, for example, 66, so that an atmosphere of a batch of dynamic comments is formed.

In the embodiment of the present disclosure, in response to the trigger operation, the type of the trigger operation is determined, the number of dynamic comments displayed on the video playing interface is determined based on the type of the trigger operation, and the dynamic comment corresponding to the number of dynamic comments is displayed on the video playing interface. In this way, different numbers of dynamic comments may be displayed on the video playing interface through different trigger operations, and the video viewer may send one or more dynamic comments by a manner such as single click or long press, which improves the flexibility of sending the dynamic comment and is convenient for the user to quickly send a batch of dynamic comments.

In an embodiment, the dynamic comment content includes a dynamic comment content item. In this case, in response to the trigger operation, the displaying the dynamic comment corresponding to the dynamic comment content on the video playing interface includes: displaying, in response to the triggering operation, a dynamic comment having the dynamic comment content, on the video playing interface.

In an embodiment of the present disclosure, the dynamic comment content is displayed on the dynamic comment identification, and the dynamic comment content is used to indicate content of the dynamic comment sent by the dynamic comment identification. The dynamic comment content may include a dynamic comment content item. The dynamic comment content item is a display item on the dynamic comment identification, which is used to display the dynamic comment content. One dynamic comment content item corresponds to one dynamic comment content. When a trigger operation on the dynamic comment identification displayed on the video playing interface is received, in response to the trigger operation, the dynamic comment that has the same dynamic comment content as the dynamic comment content item is displayed on the video playing interface.

Figure 11A:
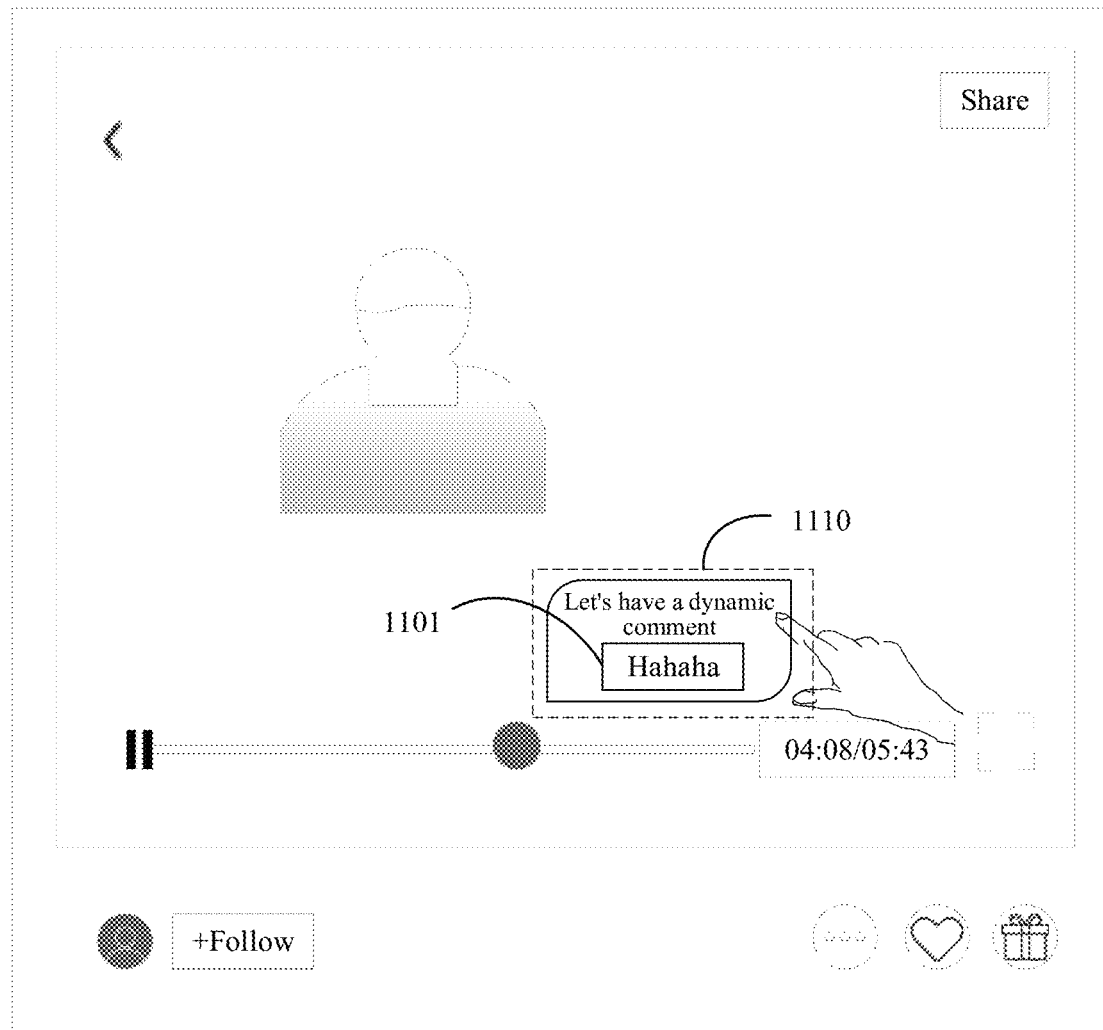
FIG. 11A is a schematic diagram of a dynamic comment identification with a dynamic comment content item on a video playing interface.
Figure 11B:
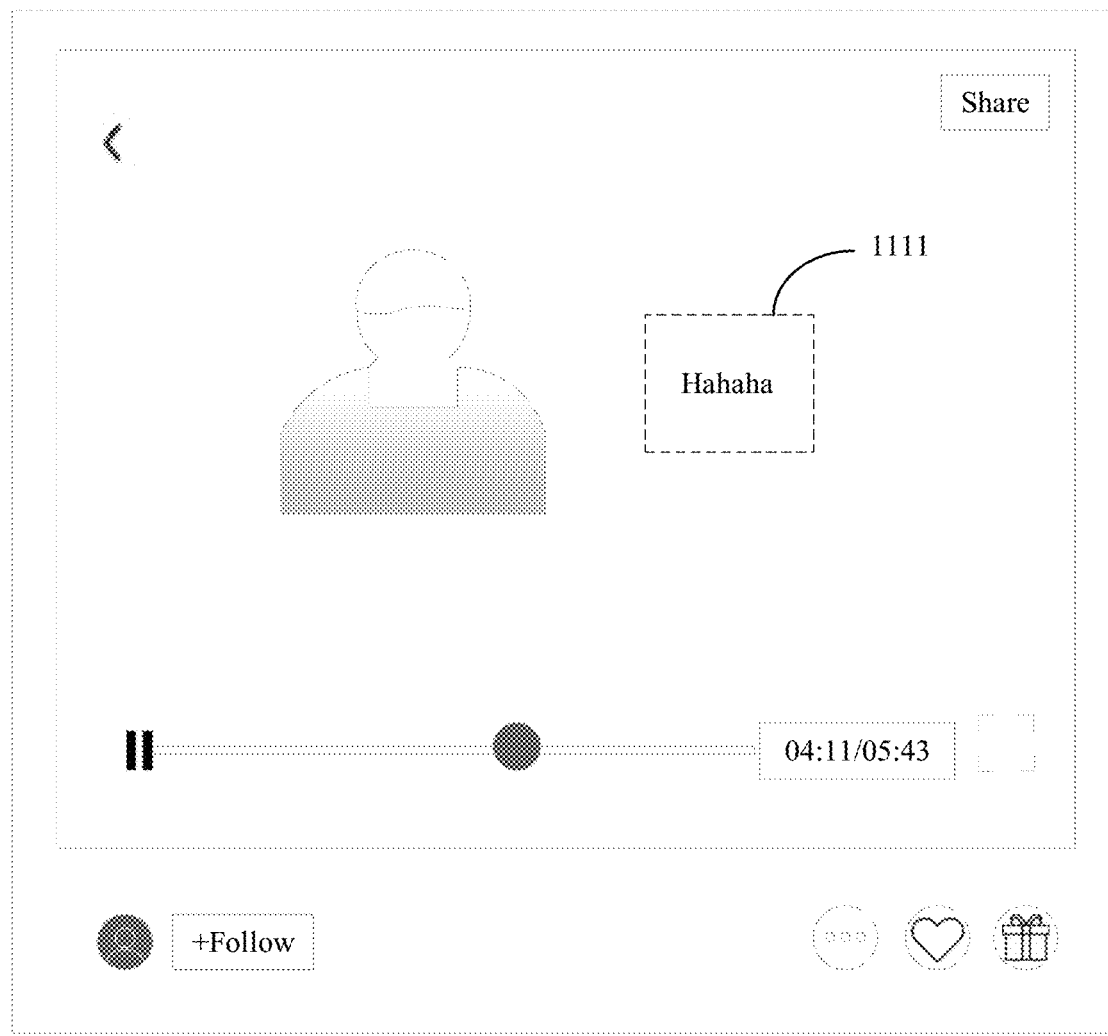
FIG. 11B is a schematic diagram of a first example for displaying a dynamic comment content on a video playing interface.

For example, FIG. 11A is a schematic diagram of a dynamic comment identification showing a dynamic comment content item on the video playing interface. As shown in FIG. 11A, the dynamic comment identification 1110 starts to be displayed when the video is played to 04:08 seconds. The dynamic comment title of the dynamic comment identification is "Let's have a dynamic comment", and the dynamic comment content is displayed on the dynamic comment identification. The dynamic comment content includes a dynamic comment content item 1101, and the dynamic comment content is "Hahaha". When the video viewer clicks on the dynamic comment identification 1110, a dynamic comment with a dynamic comment content "Hahaha" is triggered to be sent. Correspondingly, a dynamic comment with a dynamic comment content "Hahaha" is displayed on the video playing interface, such as the dynamic comment indicated by the reference numeral 1111 in FIG. 11B.

In the embodiment of the present disclosure, the dynamic comment content is displayed on the dynamic comment identification, and the dynamic comment content includes a dynamic comment content item. When a trigger operation on the dynamic comment identification displayed on the video playing interface is received, in response to the trigger operation, the dynamic comment content having the dynamic comment content is displayed on the video playing interface, which facilitates the video viewer to know the dynamic comment content corresponding to the dynamic comment identification, to determine whether the dynamic comment content meets his own needs, thereby facilitating the video viewer decides whether to send the dynamic comment through the dynamic comment identification. Thus, the sent dynamic comment may meet the user expectation.

In an embodiment, the dynamic comment content includes multiple dynamic comment content items. In this case, the displaying the dynamic comment corresponding to the dynamic comment content on the video playing interface in response to the trigger operation, includes: displaying, in response to a selection operation on at least one dynamic comment content item among the multiple dynamic comment content items, a dynamic comment corresponding to the at least one dynamic comment content item on the video playing interface.

In an embodiment of the present disclosure, the dynamic comment content may include multiple dynamic comment content items, and dynamic comment content items correspond to the respective dynamic comment contents. When the video viewer clicks at least one dynamic comment content item, in response to the click operation, a dynamic comment corresponding to at least one dynamic comment content item is displayed on the video playing interface. However, the present disclosure is not limited to this. In another embodiment, a sending control is displayed on the dynamic comment identification. The user selects at least one dynamic comment content item among multiple dynamic comment content items, and triggers the sending control on the dynamic comment identification. Then, a dynamic comment corresponding to at least one dynamic comment content item is displayed on the video playing interface.

Figure 12A:
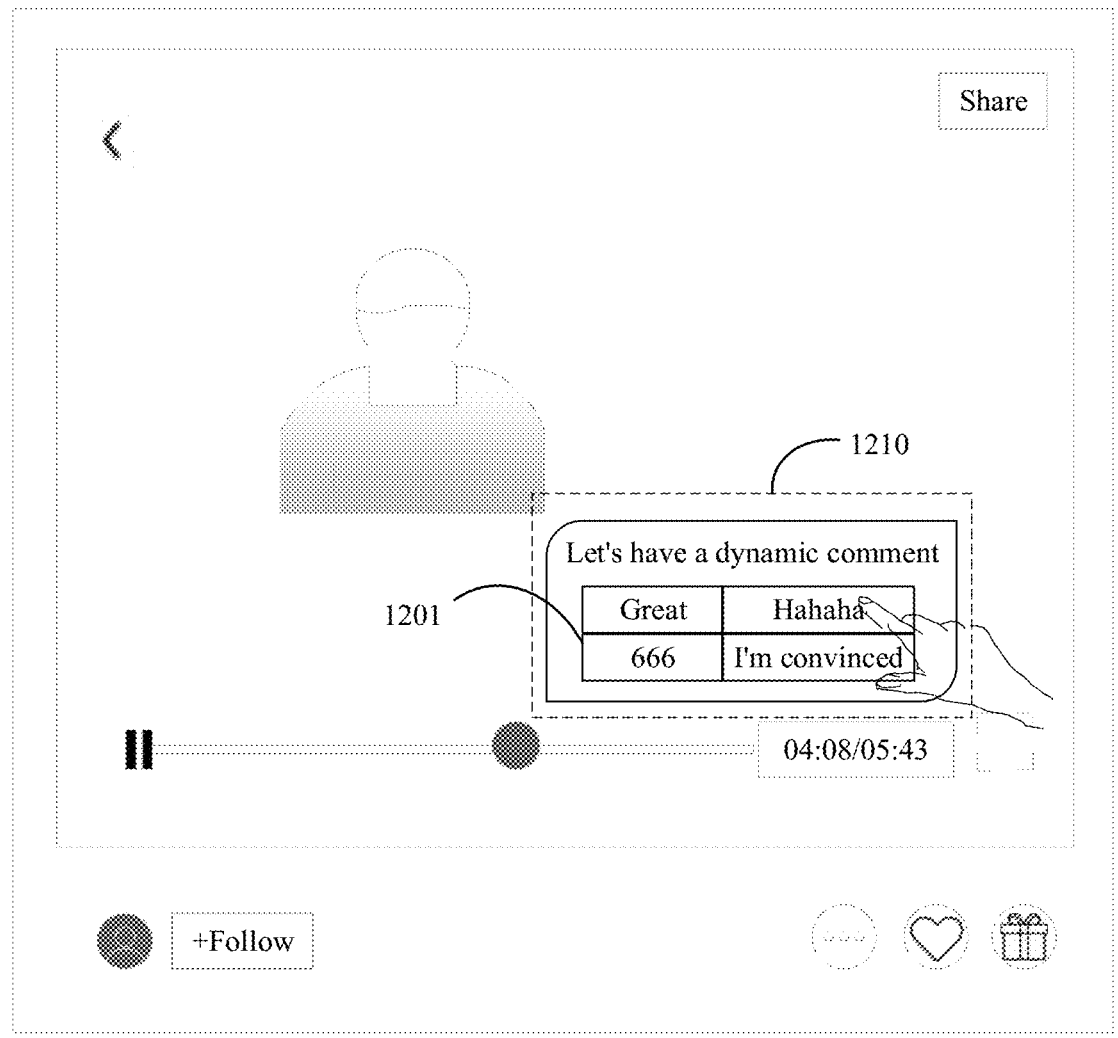
FIG. 12A is a schematic diagram of a dynamic comment identification with multiple dynamic comment content items displayed on a video playing interface.
Figure 12B:
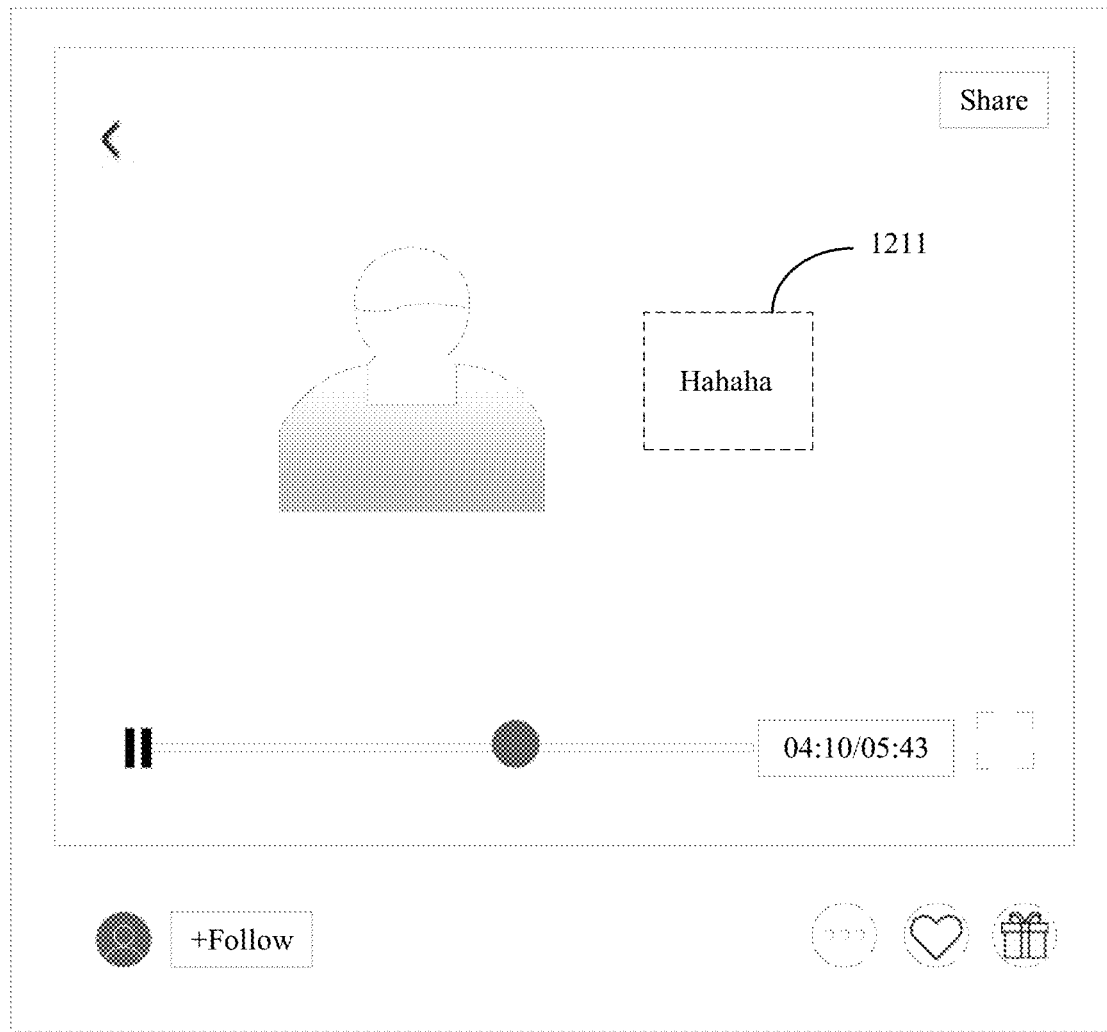
FIG. 12B is a schematic diagram of a second example for displaying a dynamic comment content on a video playing interface.
Figure 12C:
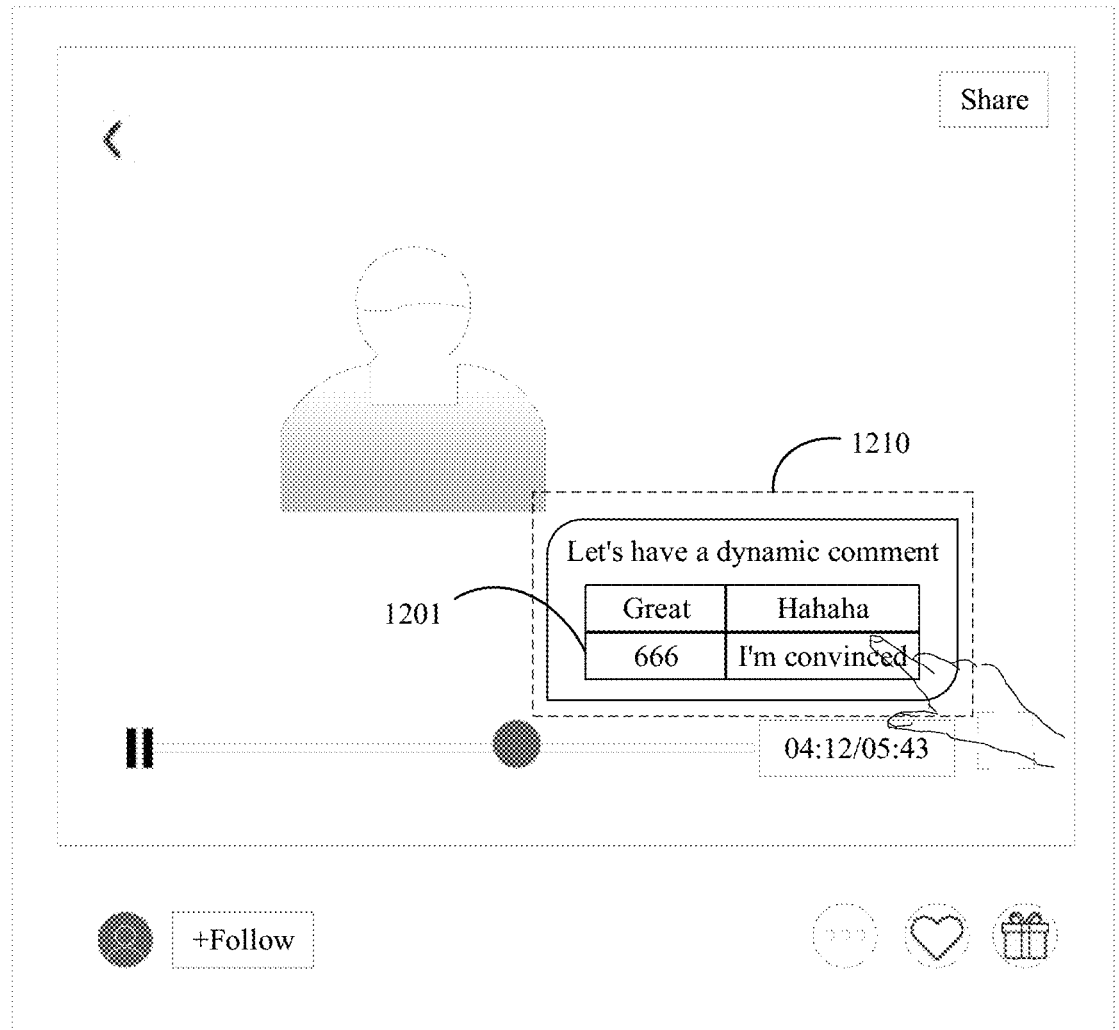
FIG. 12C is a schematic diagram of a process of a video viewer clicking on a dynamic comment content item displayed in a dynamic comment identification.
Figure 12D:
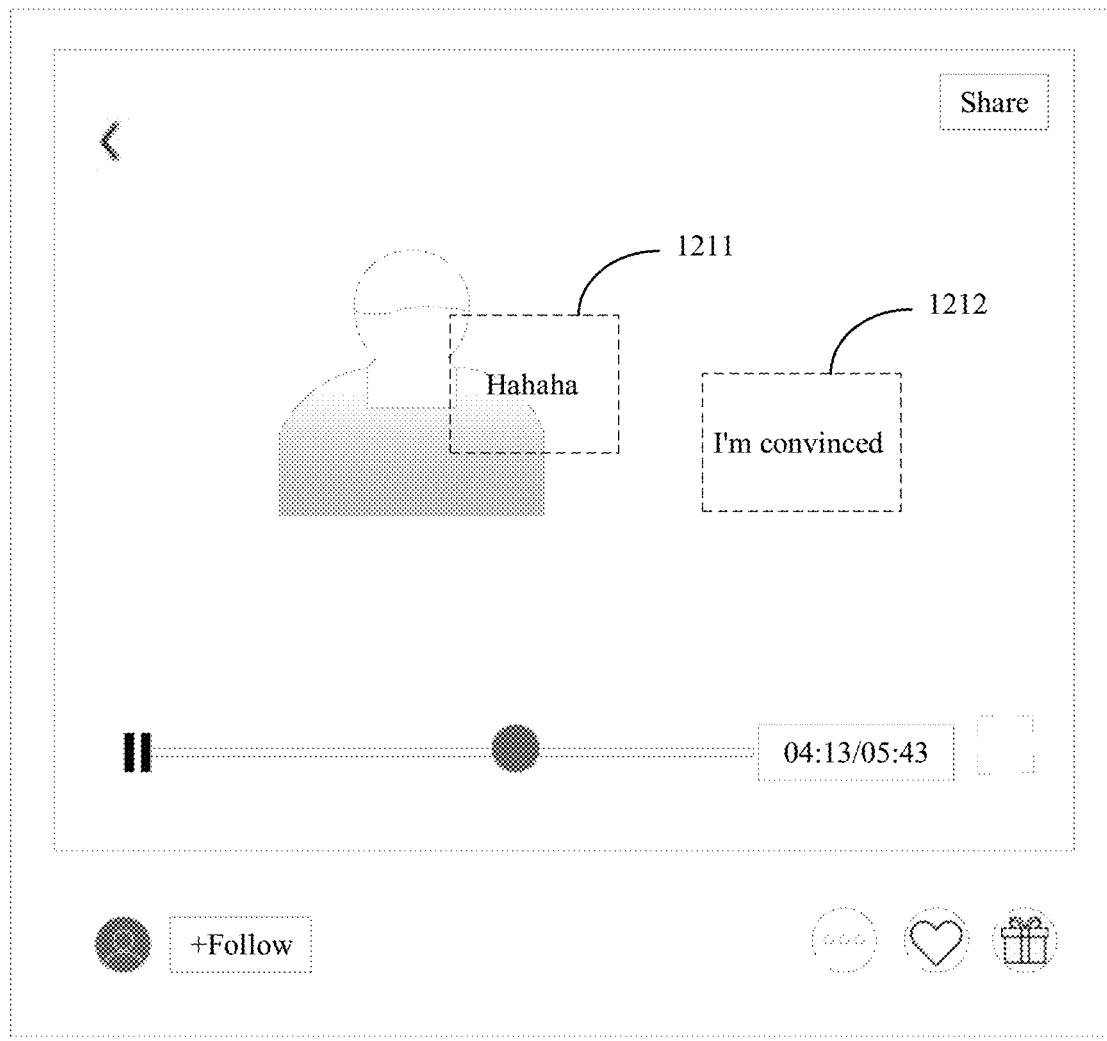
FIG. 12D is a schematic diagram of a third example for displaying a dynamic comment content on a video playing interface.

For example, FIG. 12A is a schematic diagram of a dynamic comment identification with multiple dynamic comment content items displayed in the video playing interface. As shown in FIG. 12A, the dynamic comment identification 1210 starts to be displayed when the video is played to 04:08 seconds. The dynamic comment title of the dynamic comment identification is "Let's have a dynamic comment", and the dynamic comment content is displayed on the dynamic comment identification. The dynamic comment content includes four dynamic comment content items, the dynamic comment contents of the four dynamic comment content items are "Awesome", "666", "Hahaha" and "I'm convinced", such as the dynamic comment content item indicated by the reference numeral 1201 in FIG. 12A. The video viewer may select the dynamic comment content he wants to send, from the four dynamic comment content items based on his own needs. When the video viewer clicks at least one of the four dynamic comment content items, the dynamic comment corresponding to the at least one clicked dynamic comment content item is displayed on the video playing interface. It is assumed that the video viewer first clicks on the dynamic comment content item with the dynamic comment content "Hahaha". As shown in FIG. 12A, the position pointed by the index finger is the position of the dynamic comment content "Hahaha". Then, the video viewer clicks on the dynamic comment content item with the dynamic comment content "I'm convinced". As shown in FIG. 12C, the position pointed by the index finger is the position of the dynamic comment content "I'm convinced". In this case, the dynamic comment content "Hahaha" and the dynamic comment content "I'm convinced" will be displayed in the video playing interface, such as the dynamic comments indicated by reference numbers 1211 and 1212 in FIG. 12D. In addition, when the video viewer clicks on the dynamic comment content item "Hahaha", the dynamic comment with the content "Hahaha" is displayed on the video playing interface, such as the dynamic comment indicated by the reference number 1211 in FIG. 12B. Then, the video viewer clicks on the dynamic comment content item with the content "I'm convinced", the dynamic comment with the content "I'm convinced" is displayed on the video playing interface, such as the dynamic comment indicated by the reference number 1212 in FIG. 12D.

In the embodiment of the present disclosure, the dynamic comment content is displayed on the dynamic comment identification, and the dynamic comment content includes multiple dynamic comment content items. In response to the selection operation of at least one dynamic comment content item among the multiple dynamic comment content items, the dynamic comment corresponding to the at least one dynamic comment content item is displayed on the video playing interface, so that it is convenient for the video viewer to know the multiple dynamic comment contents supported by the dynamic comment identification displayed on the video playing interface. By setting the dynamic comment identification corresponding to multiple dynamic comment content items, the video viewer is provided with a variety of optional dynamic comment contents, which is flexible and further provides convenience for the video viewer to send a dynamic comment. Thus, the user expectation is met while many selection options for dynamic comments are given to the user, thus enriching the interaction for the user to send dynamic comment, and improving the user experience.

In an embodiment of the present disclosure, the multiple dynamic comment content items may be configured by the video poster when posting the video, and the multiple dynamic comment content items may include a dynamic comment content item determined based on a video segment (a video segment type, a video segment content, a video segment screen, etc.) corresponding to a dynamic comment adding position. For example, the dynamic comment adding position is a position corresponding to a video segment between the $10^{th}$ and $12^{th}$ minutes in the video. If the video segment between the $10^{th}$ and $12^{th}$ minutes is a joke-telling type video segment, the determined corresponding dynamic comment content item may be the text or emoticon of "Hahaha". The multiple dynamic comment content items may further include a dynamic comment content item determined based on a received historical dynamic comment of a corresponding video within a historical time period.

In an embodiment, when a trigger operation on the dynamic comment identification is received, it may further be determined whether the trigger operation meets a preset condition. In the case that the trigger operation meets the preset condition, information associated with the dynamic comment is displayed on the video playing interface.

The information associated with the dynamic comment may include, but not be limited to, at least one of animations, special effects, and audios.

In an embodiment of the present disclosure, the preset condition may be preset by the video creator when making the video, or may be a preset condition configured by the video application. A trigger condition of the information associated with the dynamic comment may be, for example, that the number of triggering operations on the dynamic comment identification within the preset duration reaches a preset value, the number of consecutively sending dynamic comments reaches a preset number, and the duration of long pressing the dynamic comment identification reaches a preset duration, etc., which is not limit in the present disclosure. When the trigger operation on the dynamic comment identification meets the preset trigger condition of the information associated with the dynamic comment, the information associated with the dynamic comment is displayed on the video playing interface, such as displaying animations, easter eggs, special effects, playing preset audios, etc., to enrich the dynamic comment style.

For example, the determining whether the triggering operation meets a preset triggering condition of the information associated with the dynamic comment includes: determining whether a frequency of the triggering operation reaches a preset threshold; and determining that the preset condition is met, in the case that the frequency of the triggering operation reaches the preset threshold.

The frequency of the triggering operation may be the number of times the dynamic comment identification is triggered consecutively. Correspondingly, the preset threshold may be a click times threshold. The click times threshold may be preset as 10 times, 30 times, 66 times, etc. The frequency of the triggering operation may also be a duration of long pressing the dynamic comment identification. Correspondingly, the preset threshold may be a duration threshold, and the duration threshold may be preset as 8 seconds, 10 seconds, 15 seconds, etc.

In an embodiment of the present disclosure, when it is determined that the frequency of the triggering operation reaches the preset threshold, it is determined that the triggering operation meets the preset condition, and the information associated with the dynamic comment is displayed on the video playing interface.

Figure 13:
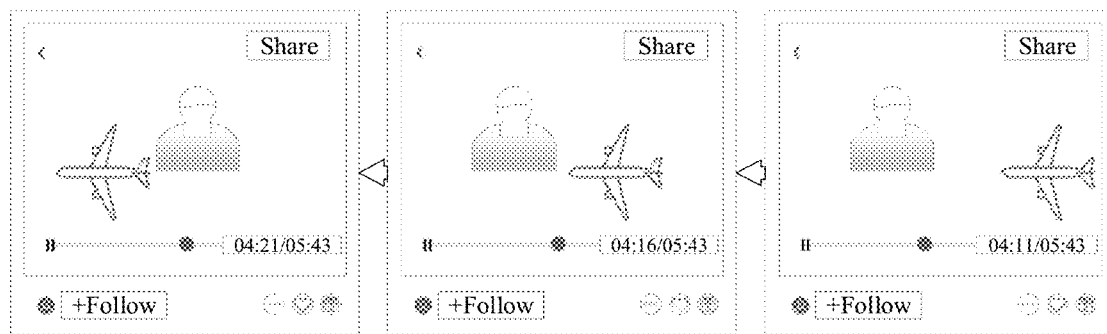
FIG. 13 is a schematic diagram of a process for displaying an animation on a video playing interface.

For example, taking the video playing interface shown in FIG. 11A as an example, it is assumed that the preset threshold is 10 times, and the preset information associated with the dynamic comment is an animation of an airplane flying into the screen from the right side of the video playing interface. When the number of times the video viewer clicks on the dynamic comment identification 1110 consecutively reaches 10 times, it is determined that the trigger operation of the dynamic comment identification 1110 meets the preset condition, and the animation of the airplane flying into the video playing interface from the right side is displayed on the video playing interface, as shown in FIG. 13. Multiple frames of images in FIG. 13 show the process of the airplane flying into the video playing interface from the right side.

Figure 14:
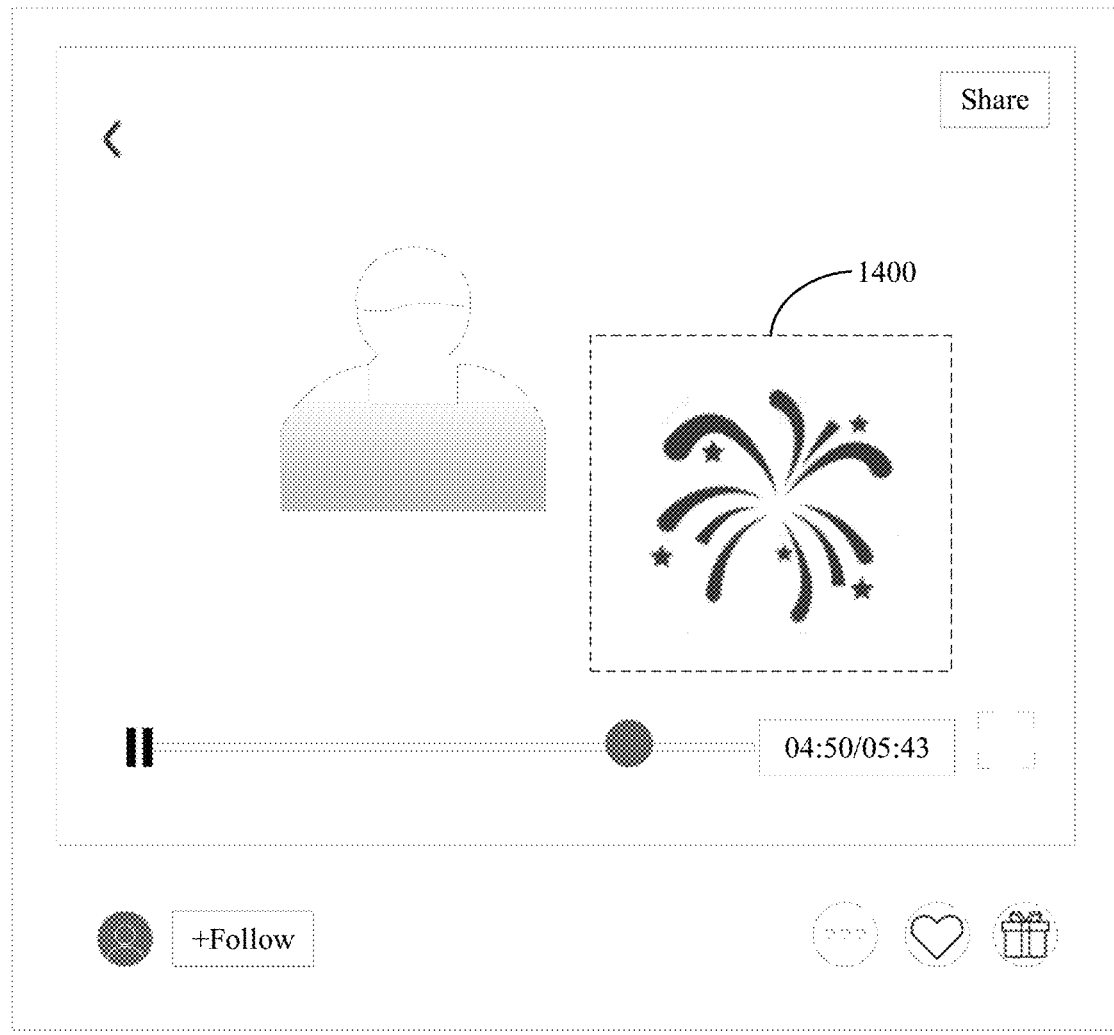
FIG. 14 is a schematic diagram of a process for displaying special effects on a video playing interface.

For example, still taking the video playing interface shown in FIG. 11A as an example, it is assumed that the preset threshold is 10 times, and the preset information associated with the dynamic comment is a special effect of setting off fireworks in the video playing interface. When the number of times the video viewer clicks on the dynamic comment identification 1110 consecutively reaches 10 times, it is determined that the trigger operation of the dynamic comment identification 1110 meets the preset condition, and the fireworks are displayed on the video playing interface, as shown in FIG. 14. The reference numeral 1400 in FIG. 14 indicates the firework special effect displayed on the video playing interface. In actual display, the fireworks special effect may be dynamically displayed, such as blooming fireworks in the video playing interface until the fireworks gradually fall.

For example, the information associated with the dynamic comment may also be a preset audio. When the trigger operation on the dynamic comment identification meets the preset condition, the preset audio is played. The preset audio may be a voice message, such as, "Great", "666"; and may also be a preset music, or an audio message corresponding to the dynamic comment content selected by the video viewer. If the user selects the dynamic comment content "Great", a voice "Great" may be played when the preset condition is met.

In the embodiment of the present disclosure, it is determined whether the trigger operation meets the preset condition. If the preset condition is met, the information associated with the dynamic comment is displayed on the video playing interface, thereby enriching the dynamic comment style and improving the visual experience of the video viewer.

In an embodiment of the present disclosure, the dynamic comment identification may be an identification that guides the video viewer to send a dynamic comment, and the dynamic comment identification may include a dynamic comment title, a sending control, and a dynamic comment content.

The dynamic comment title may be a title that guides the video viewer to send a dynamic comment, for example, "Let's have a dynamic comment". The sending control is used to receive a trigger operation of the user to send the dynamic comment. The sending control has a dynamic display style, which has a first display style before receiving the trigger operation and a second display style within a preset time after receiving the trigger operation. In addition, when the information associated with the dynamic comment is an animation, the sending control has a display style corresponding to the animation. For example, the animation is an animation of a target object, and the sending control may display a pattern of the target object. When a trigger operation is received, the pattern of the target object on the sending control is moved from the sending control to a preset position of the video playing interface, thereby generating an animation of the target object. The target object may be, for example, an airplane.

Figure 15:
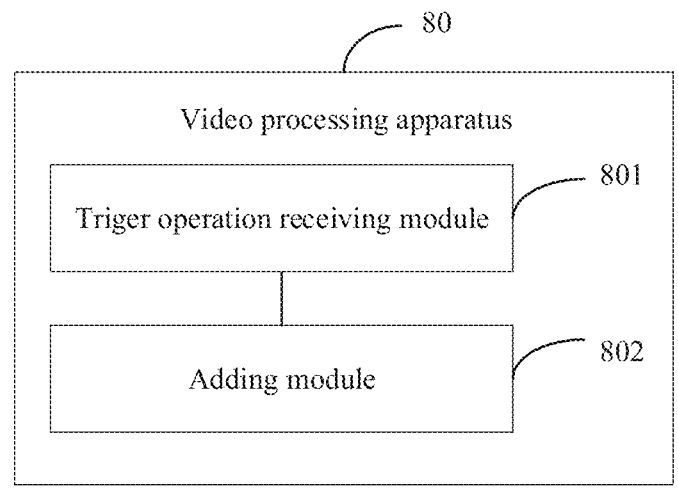
FIG. 15 is a schematic structural diagram of a video processing apparatus according to an embodiment of the present disclosure.

FIG. 15 is a schematic structural diagram of a video processing apparatus according to an embodiment of the present disclosure. The apparatus may be implemented by software and/or hardware, and generally may be integrated into an electronic device. As shown in FIG. 15, the video processing apparatus 80 may include: a trigger operation receiving module 801, and an adding module 802.

The trigger operation receiving module 801 is configured to receive a trigger operation on a dynamic comment control associated with a video to be posted.

The adding module 802 is configured to add a dynamic comment identification to the video to be posted, in response to the triggering operation, to display the dynamic comment identification in a process of playing the video.

In an embodiment, the adding module 802 may include: a setting page display unit and a dynamic comment identification adding unit.

The setting page display unit is configured to display a setting page of the dynamic comment identification in response to the trigger operation.

The dynamic comment identification adding unit is configured to receive at least one piece of setting information inputted through the setting page, and add a dynamic comment identification to the video to be posted based on the at least one piece of setting information, to display the dynamic comment identification based on the at least one piece of setting information in the process of playing the video.

In an embodiment, the dynamic comment identification adding unit is further configured to: receive at least one dynamic comment content inputted through the setting page, to display the dynamic comment identification including the at least one dynamic comment content in the process of playing the video, and display a dynamic comment corresponding to the at least one dynamic comment content on a video playing interface in response to a trigger operation on the dynamic comment identification, where the dynamic comment identification added to the video to be posted includes the at least one dynamic comment content.

Furthermore, the dynamic comment identification adding unit is further configured to: display preset candidate dynamic comment contents on the setting page, and receive a target dynamic comment content determined from the candidate dynamic comment contents as the at least one dynamic comment content; and/or receive a customized dynamic comment content inputted by a user through the setting page as the at least one dynamic comment content.

In an embodiment, the dynamic comment identification adding unit is further configured to: receive a display duration of the dynamic comment identification inputted through the setting page, to display the dynamic comment identification in the process of playing the video based on the display duration.

In an embodiment, the dynamic comment identification adding unit is further configured to: receive a start time and an end time inputted through the setting page, to display the dynamic comment identification in the process of playing the video in a playing period from the start time to the end time; or receive a start time and a duration inputted through the setting page, to display the dynamic comment identification in the process of playing the video from the start time, and keep displaying the dynamic comment identification for a period corresponding to the duration; or receive a start time inputted through the setting page, and determine a duration based on the start time and an end time of the video, to display the dynamic comment identification in the process of playing the video from the start time, and keep displaying the dynamic comment identification for a time period corresponding to the duration.

In an embodiment, at least one time edit box for at least one of the start time, the end time, and the duration is displayed on the setting page, and the dynamic comment identification adding unit is further configured to: receive one of time information pieces of the start time, the end time and the duration inputted through the time edit box, or a combination thereof; or a preview window of the video to be posted is displayed on the setting page, and the dynamic comment identification adding unit is further configured to: receive a drag operation on a progress bar on the preview window, to set the start time based on a dragging start position of the progress bar, and set the end time based on a dragging end position of the progress bar.

In an embodiment, the dynamic comment identification adding unit is further configured to: receive a dynamic comment display style set through the setting page, where the dynamic comment display style includes: a font style and/or an animation style of the dynamic comment, which is configured for displaying the dynamic comment on the video screen.

In an embodiment, the video processing apparatus 80 further includes: a preview window display module, an identification preview module and a dynamic comment preview module.

The preview window display module is configured to display a preview window of the video to be posted on the setting page.

The identification preview module is configured to display the dynamic comment identification including the dynamic comment content within a playback period corresponding to the display duration, in response to a preview operation of playing the video to be posted in the preview window.

The dynamic comment preview module is configured to display the dynamic comment content on a currently played video screen based on the font style and/or the dynamic comment animation style, in response to a trigger operation on the dynamic comment identification.

In an embodiment, the dynamic comment identification adding unit is further configured to: receive a dynamic comment title inputted through the setting page, to display the dynamic comment identification including the dynamic comment title in the process of playing the video, where the dynamic comment identification added to the video to be posted includes the dynamic comment title.

In an embodiment, the dynamic comment identification adding unit is further configured to: receive a display template and/or display position of the dynamic comment identification inputted through the setting page, to display the dynamic comment identification based on the display template and/or display position in the process of playing the video.

Furthermore, the dynamic comment identification adding unit is further configured to: display a preview window of the video to be posted on the setting page, where the dynamic comment identification is displayed on the video playing interface of the preview window; and receive a drag operation on the dynamic comment identification and determine a display position of the dynamic comment identification based on an end position of the dragging operation.

In an embodiment, the video processing apparatus 80 further includes: a dynamic comment sending operation receiving module and a dynamic comment display module.

The dynamic comment sending operation receiving module is configured to receive a dynamic comment sending trigger operation on the dynamic comment identification on a posted video playing interface.

The dynamic comment display module is configured to display a dynamic comment content and a dynamic comment animation which correspond to the dynamic comment sending trigger operation and/or the dynamic comment identification, on the video playing interface in response to the dynamic comment sending trigger operation.

The video processing apparatus according to the embodiments of the present disclosure may perform the video processing method according to any of the embodiments of the present disclosure, and has functional modules for executing the method and corresponding beneficial effects.

Figure 16:
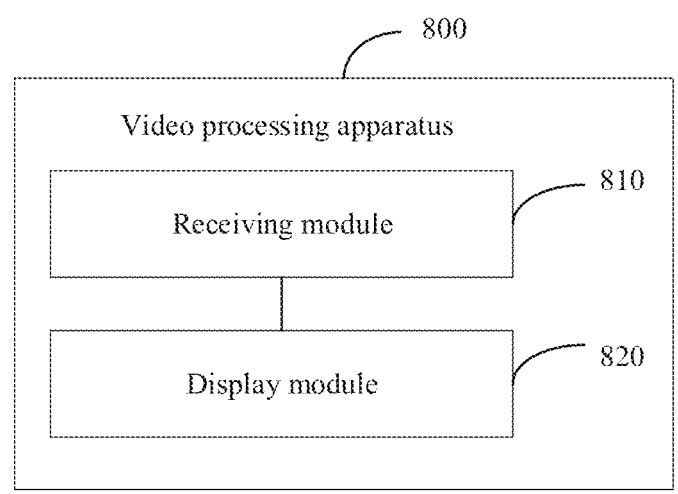
FIG. 16 is a schematic structural diagram of a video processing apparatus according to another embodiment of the present disclosure.

FIG. 16 is a schematic structural diagram of a video processing apparatus according to another embodiment of the present disclosure. The apparatus may be implemented by software and/or hardware, and may generally be integrated into an electronic device. As shown in FIG. 16, the video processing apparatus 800 may include: a receiving module 810, and a display module 820.

The receiving module 810 is configured to receive a trigger operation on a dynamic comment identification of a video playing interface, where a dynamic comment content is displayed on the dynamic comment identification.

The display module 820 is configured to display a dynamic comment corresponding to the dynamic comment content on the video playing interface in response to the trigger operation.

In an embodiment, the video processing apparatus 800 further includes: a type determining module, a dynamic comment number determining module, and a dynamic comment display module.

The type determining module is configured to determine a type of the trigger operation.

The dynamic comment number determining module is configured to determine the number of dynamic comment displayed on the video playing interface based on the type of the trigger operation.

The dynamic comment display module is configured to display the dynamic comment corresponding to the number of dynamic comment on the video playing interface.

In an embodiment, the dynamic comment content includes a dynamic comment content item, and the display module 820 is further configured to: display a dynamic comment having the dynamic comment content on the video playing interface, in response to the triggering operation.

In an embodiment, the dynamic comment content includes multiple dynamic comment content items, and the display module 820 is further configured to: display, in response to a selection operation on at least one dynamic comment content item among the multiple dynamic comment content items, a dynamic comment corresponding to the at least one dynamic comment content item on the video playing interface.

In an embodiment, the video processing apparatus 800 further includes: a detection module and an associated information display module.

The detection module is configured to determine whether the trigger operation meets a preset condition.

The associated information display module is configured to display information associated with the dynamic comment on the video playing interface in the case that the trigger operation meets the preset condition.

In an embodiment, the detection module is further configured to: determine whether a frequency of the triggering operation reaches a preset threshold; and determine that the preset condition is met, in the case that the preset threshold value is reached.

The video processing apparatus according to the embodiments of the present disclosure may perform the video processing method according to any one of the embodiments of the present disclosure, and has functional modules for executing the method and corresponding beneficial effects.

In order to implement the above embodiments, a computer program product is further provided according to the present disclosure, which includes a computer program/instruction. The computer program/instruction, when executed by a processor, performs the video processing methods in the above embodiments.

Figure 17:
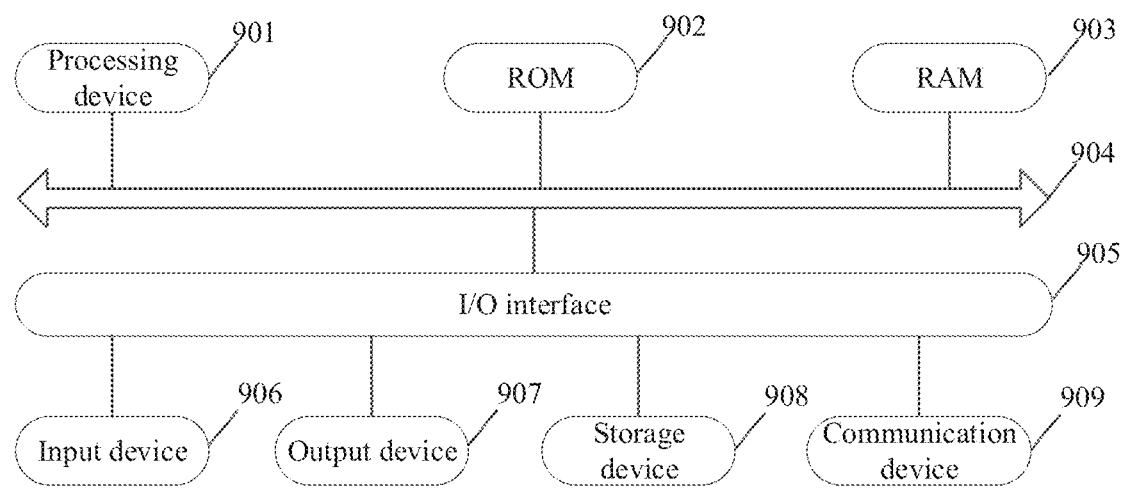
FIG. 17 is a schematic structural diagram of an electronic device according to an embodiment of the present disclosure.

FIG. 17 is a schematic structural diagram of an electronic device according to an embodiment of the present disclosure.

Reference is made to FIG. 17, which is a schematic structural diagram of an electronic device 900 suitable for implementing an embodiment of the present disclosure. The electronic device 900 in the embodiment of the present disclosure may include, but is not limited to, a mobile terminal such as a mobile phone, a notebook computer, a digital broadcast receiver, a Personal Digital Assistant (PDA), a Tablet (PAD), a Portable Multimedia Player (PMP), a vehicle-mounted terminal (for example, an in-vehicle navigation terminal); and a stationary terminal such as a digital TV, a desktop computer. The electronic device shown in FIG. 17 is only an example, and should not impose any limitation on the function and use range of the embodiments of the present disclosure.

As shown in FIG. 17, the electronic device 900 may include a processing device 901 (for example, a central processing unit, a graphics processor, and the like), which may execute various appropriate actions and processes based on programs stored in a read only memory (ROM) 902 or programs loaded from a storage device 908 into a random access memory (RAM) 903. In the RAM 903, various programs and data necessary for the operation of the electronic device 900 are also stored. The processing device 901, the ROM 902, and the RAM 903 are connected to each other through a bus 904. An input/output (I/O) interface 905 is also connected to bus 904.

In general, the following devices may be connected to the I/O interface 905: an input device 906 including, for example, a touch screen, a touch pad, a keyboard, a mouse, a camera, a microphone, an accelerometer, a gyroscope, and the like; an output device 907 including, for example, a liquid crystal display (LCD), a speaker, a vibrator, and the like; a storage device 908 including, for example, a magnetic tape, a hard disk, and the like; and a communication device 909. The communication device 909 may allow the electronic device to communicate wirelessly or by wire with other devices to exchange data. Although FIG. 17 shows an electronic device having various means, it should be understood that not all of the illustrated means are required to be implemented or available. More or fewer means may alternatively be implemented or provided.

In particular, according to embodiments of the present disclosure, the processes described above with reference to the flowcharts may be implemented as computer software programs. For example, a computer program product is provided according to an embodiment of the present disclosure include, which includes a computer program carried on a non-transitory computer readable medium, the computer program includes program codes for performing the method shown in the flowchart. In the embodiment, the computer program may be downloaded and installed from the network via the communication device 909, or from the storage device 908, or from the ROM 902. When the computer program is executed by the processing device 901, the functions defined in the methods of the embodiments of the present disclosure are executed.

It should be noted that the computer-readable medium of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus or device, or any combination thereof. More specific examples of computer readable storage medium may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium that includes or stores a program that may be used by or in conjunction with an instruction execution system, apparatus, or device. In the present disclosure, the computer-readable signal medium may include a data signal propagated in baseband or as part of a carrier wave with computer-readable program code embodied thereon. Such propagated data signals may take a variety of forms, including but not limited to electromagnetic signals, optical signals, or any suitable combination thereof. The computer-readable signal medium may also be any computer-readable medium other than a computer-readable storage medium that may transmit, propagate, or transport the program for use by or in connection with the instruction execution system, apparatus, or device. Program codes embodied on a computer readable medium may be transmitted using any suitable medium including, but not limited to, electrical wire, optical fiber cable, radio frequency (RF), and the like, or any suitable combination thereof.

In some embodiments, the client and the server may use any currently known or future developed network protocol such as HTTP (HyperText Transfer Protocol) to communicate, and may interconnect with any form or medium digital data communications (for example, communications networks). Examples of communication networks include local area networks ("LAN"), wide area networks ("WAN"), the Internet (for example, the Internet), and peer-to-peer networks (for example, ad hoc peer-to-peer networks), as well as any currently known or future development networks.

The computer-readable medium may be included in the electronic device, or exist alone without being assembled into the electronic device.

The computer-readable medium carries one or more programs, and when the one or more programs are executed by the electronic device, the electronic device is caused to: receive a trigger operation on a dynamic comment control associated with a video to be posted; and add a dynamic comment identification to the video to be posted in response to the triggering operation, to display the dynamic comment identification in a process of playing the video.

Computer program codes for performing operations of the present disclosure may be written in one or more programming languages, including but not limited to object-oriented programming languages, such as Java, Smalltalk, C++, also including conventional procedural programming languages, such as the "C" language or similar programming languages. The program codes may be executed entirely on a computer of a user, partly on a computer of a user, as a stand-alone software package, partly on a computer of a user and partly on a remote computer, or entirely on a remote computer or server. In the case of a remote computer, the remote computer may be connected to the computer of the user through any kind of networks, including a local area network (LAN) or a wide area network (WAN), or may be connected to an external computer (for example, via Internet connection by an Internet service provider).

The flowchart and block diagrams in the Figures illustrate the architecture, functionality, and operation that may be implemented by systems, methods and computer program products according to various embodiments of the present disclosure. In this regard, each block in the flowchart or block diagrams may represent a module, segment, or portion of code that includes one or more executable instructions for implementing specified logical functions. It should also be noted that, in some alternative implementations, the functions noted in the blocks may be implemented out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowcharts, and combinations of blocks in the block diagrams and/or flowcharts, may be implemented in dedicated hardware-based systems that perform the specified functions or operations, or may be implemented in a combination of dedicated hardware and computer instructions.

The units involved in the embodiments of the present disclosure may be implemented in a software manner, or in a hardware manner. The name of the unit does not constitute a limitation of the unit itself under certain circumstances.

The functions described herein may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may include or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash memory), a fiber optic, a compact disk read only memory (CD-ROM), an optical storage device, a magnetic storage device, or any suitable combination thereof.

According to one or more embodiments of the present disclosure, a video processing method is provided according to the present disclosure, which includes:
  receiving a trigger operation on a dynamic comment control associated with a video to be posted; and
  adding a dynamic comment identification to the video to be posted, in response to the triggering operation, to display the dynamic comment identification in a process of playing the video.

According to one or more embodiments of the present disclosure, in the video processing method according to the present disclosure, the adding a dynamic comment identification to the video to be posted, in response to the trigger operation, to display the dynamic comment identification in a process of playing the video, includes:
  displaying a setting page of the dynamic comment identification, in response to the triggering operation; and
  receiving at least one piece of setting information inputted through the setting page, and adding the dynamic comment identification to the video to be posted based on the at least one piece of setting information, to display the dynamic comment identification based on the at least one piece of setting information in the process of playing the video.

According to one or more embodiments of the present disclosure, in the video processing method according to the present disclosure, the receiving at least one piece of setting information inputted through the setting page, and adding the dynamic comment identification to the video to be posted based on the at least one piece of setting information, to display the dynamic comment identification based on the at least one piece of setting information in the process of playing the video, includes:
  receiving at least one dynamic comment content inputted through the setting page, to display the dynamic comment identification including the at least one dynamic comment content in the process of playing the video, and display a dynamic comment corresponding to the at least one dynamic comment content on a video playing interface in response to a trigger operation on the dynamic comment identification, where the dynamic comment identification added to the video to be posted includes the at least one dynamic comment content.

According to one or more embodiments of the present disclosure, in the video processing method according to the present disclosure, the receiving at least one dynamic comment content inputted through the setting page includes:
  displaying preset candidate dynamic comment contents on the setting page; and receiving a target dynamic comment content determined from the candidate dynamic comment contents, as the at least one dynamic comment content; and/or
  receiving a customized dynamic comment content inputted by a user through the setting page, as the at least one dynamic comment content.

According to one or more embodiments of the present disclosure, in the video processing method according to the present disclosure, the receiving at least one piece of setting information inputted through the setting page, and adding the dynamic comment identification to the video to be posted based on the at least one piece of setting information, to display the dynamic comment identification based on the at least one piece of setting information in the process of playing the video, includes:
  receiving a display duration of the dynamic comment identification inputted through the setting page, to display the dynamic comment identification in the process of playing the video based on the display duration.

According to one or more embodiments of the present disclosure, in the video processing method according to the present disclosure, the receiving a display duration of the dynamic comment identification inputted through the setting page, to display the dynamic comment identification in the process of playing the video based on the display duration, includes:
  receiving a start time and an end time inputted through the setting page, to display the dynamic comment identification in the process of playing the video based on a playing period from the start time to the end time; or
  receiving a start time and a duration inputted through the setting page, to display the dynamic comment identification in the process of playing the video from the start time, and keep displaying the dynamic comment identification for a period corresponding to the duration; or
  receiving a start time inputted through the setting page, and determining a duration based on the start time and an end time of the video, to display the dynamic comment identification in the process of playing the video from the start time, and keep displaying the dynamic comment identification for a time period corresponding to the duration.

According to one or more embodiments of the present disclosure, in the video processing method according to the present disclosure, the method further includes:
  displaying at least one time edit box for at least one of the start time, the end time, and the duration on the setting page, and receiving one of time information pieces of the start time, the end time and the duration inputted through the time edit box, or a combination thereof; or
  displaying a preview window of the video to be posted on the setting page, and receiving a drag operation on a progress bar on the preview window, to set the start time based on a dragging start position of the progress bar, and set the end time based on a dragging end position of the progress bar.

According to one or more embodiments of the present disclosure, in the video processing method according to the present disclosure, the receiving at least one piece of setting information inputted through the setting page, and adding the dynamic comment identification to the video to be posted based on the at least one piece of setting information, to display the dynamic comment identification based on the at least one piece of setting information in the process of playing the video, includes:
  receiving a dynamic comment title inputted through the setting page, to display the dynamic comment identification including the dynamic comment title in the process of playing the video, where the dynamic comment identification added to the video to be posted includes the dynamic comment title.

According to one or more embodiments of the present disclosure, in the video processing method according to the present disclosure, the receiving at least one piece of setting information inputted through the setting page, and adding the dynamic comment identification to the video to be posted based on the at least one piece of setting information, to display the dynamic comment identification based on the at least one piece of setting information in the process of playing the video, includes:
  receiving a display template and/or a display position of the dynamic comment identification inputted through the setting page, to display the dynamic comment identification based on the display template and/or display position in the process of playing the video.

According to one or more embodiments of the present disclosure, in the video processing method according to the present disclosure, the receiving the display position of the dynamic comment identification inputted through the setting page includes:
  displaying a preview window of the video to be posted on the setting page, where the dynamic comment identification is displayed on a video playing interface of the preview window; and
  receiving a drag operation on the dynamic comment identification, and determining a display position of the dynamic comment identification based on an end position of the dragging operation.

According to one or more embodiments of the present disclosure, a video processing method is provided according to the present disclosure provides, which includes:
  receiving a trigger operation on a dynamic comment identification of a video playing interface, where a dynamic comment content is displayed on the dynamic comment identification; and
  displaying a dynamic comment corresponding to the dynamic comment content on the video playing interface, in response to the trigger operation.

According to one or more embodiments of the present disclosure, in the video processing method according to the present disclosure, the dynamic comment content includes a dynamic comment content item, the displaying a dynamic comment corresponding to the dynamic comment content on the video playing interface, in response to the trigger operation includes:
  displaying a dynamic comment having the dynamic comment content on the video playing interface, in response to the triggering operation.

According to one or more embodiments of the present disclosure, in the video processing method according to the present disclosure, the dynamic comment content includes multiple dynamic comment content items, the displaying a dynamic comment corresponding to the dynamic comment content on the video playing interface, in response to the trigger operation includes:
  displaying, in response to a selection operation on at least one dynamic comment content item among the multiple dynamic comment content items, a dynamic comment corresponding to the at least one dynamic comment content item on the video playing interface.

According to one or more embodiments of the present disclosure, the video processing method according to the present disclosure further includes:
  determining a type of the trigger operation;
  determining the number of dynamic comment displayed on the video playing interface based on the type of the trigger operation; and
  displaying the dynamic comment corresponding to the number of dynamic comment on the video playing interface.

According to one or more embodiments of the present disclosure, the video processing method according to the present disclosure further includes:
  determining whether the trigger operation meets a preset condition; and
  displaying information associated with the dynamic comment on the video playing interface, in a case that the trigger operation meets the preset condition.

According to one or more embodiments of the present disclosure, in the video processing method according to the present disclosure, the determining whether the trigger operation meets a preset condition includes:
  determining whether a frequency of the triggering operation reaches a preset threshold; and determining that the trigger operation meets the preset condition, in a case that the frequency of the triggering operation reaches the preset threshold.

According to one or more embodiments of the present disclosure, a video processing apparatus is provided according to the present disclosure, which includes:
 a trigger operation receiving module configured to receive a trigger operation on a dynamic comment control associated with a video to be posted; and
 an adding module configured to add a dynamic comment identification to the video to be posted, in response to the trigger operation, to display the dynamic comment identification in a process of playing the video.

According to one or more embodiments of the present disclosure, in the video processing apparatus according to the present disclosure, the adding module may include may include: a setting page display unit and a dynamic comment identification adding unit.

The setting page display unit is configured to display a setting page of the dynamic comment identification in response to the trigger operation.

The dynamic comment identification adding unit is configured to receive at least one piece of setting information inputted through the setting page, and add a dynamic comment identification to the video to be posted based on the at least one piece of setting information, to display the dynamic comment identification based on the at least one piece of setting information in the process of playing the video.

According to one or more embodiments of the present disclosure, in the video processing apparatus according to the present disclosure, the dynamic comment identification adding unit is further configured to: receive at least one dynamic comment content inputted through the setting page, to display the dynamic comment identification including the at least one dynamic comment content in the process of playing the video, and display a dynamic comment corresponding to the at least one dynamic comment content on a video playing interface in response to a trigger operation on the dynamic comment identification, where the dynamic comment identification added to the video to be posted includes the at least one dynamic comment content.

According to one or more embodiments of the present disclosure, in the video processing apparatus according to the present disclosure, the dynamic comment identification adding unit is further configured to: display preset candidate dynamic comment contents on the setting page, and receive a target dynamic comment content determined from the candidate dynamic comment contents as the at least one dynamic comment content; and/or receive a customized dynamic comment content inputted by a user through the setting page as the at least one dynamic comment content.

According to one or more embodiments of the present disclosure, in the video processing apparatus according to the present disclosure, the dynamic comment identification adding unit is further configured to: receive a display duration of the dynamic comment identification inputted through the setting page, to display the dynamic comment identification in the process of playing the video based on the display duration.

According to one or more embodiments of the present disclosure, in the video processing apparatus according to the present disclosure, the dynamic comment identification adding unit is further configured to: receive a start time and an end time inputted through the setting page, to display the dynamic comment identification in the process of playing the video based on a playing period from the start time to the end time; or receive a start time and a duration inputted through the setting page, to display the dynamic comment identification in the process of playing the video from the start time, and keep displaying the dynamic comment identification for a period corresponding to the duration; or receive a start time inputted through the setting page, and determine a duration based on the start time and an end time of the video, to display the dynamic comment identification in the process of playing the video from the start time, and keep displaying the dynamic comment identification for a time period corresponding to the duration.

According to one or more embodiments of the present disclosure, in the video processing apparatus according to the present disclosure, at least one time edit box for at least one of the start time, the end time, and the duration on the setting page is displayed on the setting page, and the dynamic comment identification adding unit is further configured to: receive one of time information pieces of the start time, the end time and the duration inputted through the time edit box, or a combination thereof; or a preview window of the video to be posted is displayed on the setting page, and the dynamic comment identification adding unit is further configured to: receive a drag operation on a progress bar on the preview window, to set the start time based on a dragging start position of the progress bar, and set the end time based on a dragging end position of the progress bar.

According to one or more embodiments of the present disclosure, in the video processing apparatus according to the present disclosure, the dynamic comment identification adding unit is further configured to: receive a dynamic comment title inputted through the setting page, to display the dynamic comment identification including the dynamic comment title in the process of playing the video, where the dynamic comment identification added to the video to be posted includes the dynamic comment title.

According to one or more embodiments of the present disclosure, in the video processing apparatus according to the present disclosure, the dynamic comment identification adding unit is further configured to: receive a display template and/or display position of the dynamic comment identification inputted through the setting page, to display the dynamic comment identification based on the display template and/or display position in the process of playing the video.

According to one or more embodiments of the present disclosure, in the video processing apparatus according to the present disclosure, the dynamic comment identification adding unit is further configured to: display a preview window of the video to be posted on the setting page, where the dynamic comment identification is displayed on the video playing interface of the preview window; and receive a drag operation on the dynamic comment identification, and determine a display position of the dynamic comment identification based on an end position of the dragging operation.

According to one or more embodiments of the present disclosure, a video processing apparatus is provided according to the present disclosure, which includes:
 a receiving module configured to receive a trigger operation on a dynamic comment identification of a video playing interface, where a dynamic comment content is displayed on the dynamic comment identification; and
 a display module configured to display a dynamic comment corresponding to the dynamic comment content on the video playing interface in response to the trigger operation.

According to one or more embodiments of the present disclosure, in the video processing apparatus according to the present disclosure, the dynamic comment content includes a dynamic comment content item.

The display module is further configured to display a dynamic comment having the dynamic comment content on the video playing interface, in response to the triggering operation.

According to one or more embodiments of the present disclosure, in the video processing apparatus according to the present disclosure, the dynamic comment content includes multiple dynamic comment content items.

The display module is further configured to display, in response to a selection operation on at least one dynamic comment content item among the multiple dynamic comment content items, a dynamic comment corresponding to the at least one dynamic comment content item on the video playing interface.

According to one or more embodiments of the present disclosure, in the video processing apparatus according to the present disclosure, the video processing apparatus further includes:
 a type determining module configured to determine a type of the trigger operation;
 a dynamic comment number determining module configured to determine the number of dynamic comment displayed on the video playing interface based on the type of the trigger operation; and
 a dynamic comment display module configured to display the dynamic comment corresponding to the number of dynamic comment on the video playing interface.

According to one or more embodiments of the present disclosure, in the video processing apparatus according to the present disclosure, the video processing apparatus further includes:
 a detection module configured to determine whether the trigger operation meets a preset condition; and
 an associated information display module configured to display information associated with the dynamic comment on the video playing interface in the case that the trigger operation meets the preset condition.

According to one or more embodiments of the present disclosure, in the video processing apparatus according to the present disclosure, the detection module is further configured to:
 determine whether a frequency of the triggering operation reaches a preset threshold; and
 determine that the preset condition is met, in a case that the frequency reaches the preset threshold.

According to one or more embodiments of the present disclosure, an electronic device is provided according to the present disclosure, which includes: a processor; and a memory configured to store executable instructions of the processor, where the processor is configured to read the executable instructions from the memory, and execute the instructions to perform any one of the video processing methods according to the present disclosure.

According to one or more embodiments of the present disclosure, a computer-readable storage medium is provided according to the present disclosure. The storage medium stores a computer program, and the computer program is configured to execute any one of the video processing methods according to the present disclosure.

The above description only shows preferred embodiments of the present disclosure and an illustration of the applied technical principles. Those skilled in the art should understand that the scope of the present disclosure is not limited to the technical solutions formed by the specific combination of the technical features, and should also cover, without departing from the disclosed concept, other the technical solutions formed by any combination of the technical features and their equivalent features, for example, a technical solution is formed by replacing the above features with the technical features disclosed in the present disclosure (but not limited to) with similar functions.

Furthermore, although operations are described in a particular order, this should not be construed as requiring that the operations be performed in the particular order shown or in a sequential order. Under certain circumstances, multitasking and parallel processing may be advantageous. Likewise, although the above description includes several implementation details, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub combination.

Although the subject matter has been described in language specific to structural features and/or logical acts, it is to be understood that the subject matter defined in the claims is not necessarily limited to the specific features or acts described above. Rather, the specific features and acts described above are merely example forms of implementing the claims.

The invention claimed is:

1. A video processing method, comprising:
 receiving a trigger operation on a dynamic comment control associated with a video; and
 adding a dynamic comment identification to the video, in response to the triggering operation, to display the dynamic comment identification in a process of playing the video, and
 wherein the adding the dynamic comment identification to the video, in response to the triggering operation comprises:
 receiving at least one dynamic comment content, to display the dynamic comment identification comprising the at least one dynamic comment content in the process of playing the video, and to display a dynamic comment corresponding to the at least one dynamic comment content on a video playing interface in response to a trigger operation on the dynamic comment identification.

2. The method according to claim 1, wherein the adding the dynamic comment identification to the video, in response to the trigger operation, to display the dynamic comment identification in the process of playing the video, comprises:
 displaying a setting page of the dynamic comment identification, in response to the triggering operation; and
 receiving setting information inputted through the setting page, and adding the dynamic comment identification to the video based on the setting information, to display the dynamic comment identification based on the setting information in the process of playing the video.

3. The method according to claim 2, wherein the receiving the setting information inputted through the setting page, and adding the dynamic comment identification to the video based on the setting information, to display the dynamic comment identification based on the setting information in the process of playing the video, comprises:
 receiving the at least one dynamic comment content inputted through the setting page.

4. The method according to claim 2, wherein the receiving the setting information inputted through the setting page, and adding the dynamic comment identification to the video based on the setting information, to display the dynamic comment identification based on the setting information in the process of playing the video, comprises:
- receiving a dynamic comment title inputted through the setting page, to display the dynamic comment identification comprising the dynamic comment title in the process of playing the video, wherein the dynamic comment identification added to the video comprises the dynamic comment title.

5. The method according to claim 2, wherein the setting information comprises at least one of a display template or a display position of the dynamic comment identification.

6. The method according to claim 5, wherein the receiving the display position of the dynamic comment identification inputted through the setting page comprises:
- displaying a preview window of the video on the setting page, wherein the dynamic comment identification is displayed on a video playing interface of the preview window; and
- receiving a drag operation on the dynamic comment identification, and determining a display position of the dynamic comment identification based on an end position of the dragging operation.

7. The method according to claim 3, wherein the receiving the at least one dynamic comment content inputted through the setting page comprises at least one of:
- displaying preset candidate dynamic comment contents on the setting page; and receiving a target dynamic comment content determined from the candidate dynamic comment contents, as the at least one dynamic comment content; or
- receiving a customized dynamic comment content inputted by a user through the setting page, as the at least one dynamic comment content.

8. The method according to claim 3, wherein the receiving the setting information inputted through the setting page, and adding the dynamic comment identification to the video based on the setting information, to display the dynamic comment identification based on the setting information in the process of playing the video, comprises:
- receiving a display duration of the dynamic comment identification inputted through the setting page, to display the dynamic comment identification in the process of playing the video based on the display duration.

9. The method according to claim 8, wherein the receiving the display duration of the dynamic comment identification inputted through the setting page, to display the dynamic comment identification in the process of playing the video based on the display duration, comprises:
- receiving a start time and an end time inputted through the setting page, to display the dynamic comment identification the process of playing the video in a playing period from the start time to the end time; or
- receiving a start time and a duration inputted through the setting page, to display the dynamic comment identification the process of playing the video from the start time, and keep displaying the dynamic comment identification for a period corresponding to the duration; or
- receiving a start time inputted through the setting page, and determining a duration based on the start time and an end time of the video, to display the dynamic comment identification the process of playing the video from the start time, and keep displaying the dynamic comment identification for a time period corresponding to the duration.

10. The method according to claim 9, further comprising:
- displaying at least one time edit box of at least one of the start time, the end time, and the duration on the setting page, and receiving one of time information pieces of the start time, the end time and the duration inputted through the time edit box, or a combination thereof, or
- displaying a preview window of the video on the setting page, and receiving a drag operation on a progress bar on the preview window, to set the start time based on a dragging start position of the progress bar, and set the end time based on a dragging end position of the progress bar.

11. A video processing method, comprising:
- playing a video on a video playing interface, wherein a dynamic comment identification is added to the video and displayed on the video playing interface, and the dynamic comment identification added to the video comprises at least one received dynamic comment content,
- receiving a trigger operation on the dynamic comment identification on a video playing interface; and
- displaying a dynamic comment corresponding to the dynamic comment content on the video playing interface, in response to the trigger operation.

12. The method according to claim 11, wherein the dynamic comment content comprises one dynamic comment content item;
- the displaying the dynamic comment corresponding to the dynamic comment content on the video playing interface, in response to the trigger operation comprises:
  - displaying a dynamic comment having the dynamic comment content on the video playing interface, in response to the triggering operation.

13. The method according to claim 11, wherein the dynamic comment content comprises a plurality of dynamic comment content items,
- the displaying the dynamic comment corresponding to the dynamic comment content on the video playing interface, in response to the trigger operation comprises:
  - displaying, in response to a selection operation on at least one dynamic comment content item among the plurality of dynamic comment content items, a dynamic comment corresponding to the at least one dynamic comment content item on the video playing interface.

14. The method according to claim 11, further comprising:
- determining a type of the trigger operation;
- determining a number of dynamic comment displayed on the video playing interface based on the type of the trigger operation; and
- displaying the dynamic comment corresponding to the number of dynamic comment on the video playing interface.

15. The method according to claim 11, further comprising:
- determining whether the trigger operation meets a preset condition; and
- displaying information associated with the dynamic comment on the video playing interface, in a case that the trigger operation meets the preset condition.

16. The method according to claim 15, wherein the determining whether the trigger operation meets the preset condition comprises:

determining whether a frequency of the triggering operation reaches a preset threshold; and determining that the trigger operation meets the preset condition in a case that the frequency of the triggering operation reaches the preset threshold.

17. An electronic device, comprising:

a processor; and a memory configured to store instructions executable by the processor, wherein the processor is configured to read the executable instructions from the memory, and execute the executable instructions to:

receive a trigger operation on a dynamic comment control associated with a video; add a dynamic comment identification to the video, in response to the triggering operation, to display the dynamic comment identification in a process of playing the video; wherein the processor executes the executable instructions to: receive at least one dynamic comment content, to display the dynamic comment identification comprising the at least one dynamic comment content in the process of playing the video, and to display a dynamic comment corresponding to the at least one dynamic comment content on a video playing interface in response to a trigger operation on the dynamic comment identification; or play a video on a video playing interface, wherein a dynamic comment identification is added to the video and displayed on the video playing interface, and the dynamic comment identification added to the video comprises at least one received dynamic comment content; receive a trigger operation on the dynamic comment identification on a video playing interface; and display a dynamic comment corresponding to the dynamic comment content on the video playing interface, in response to the trigger operation.

18. The electronic device according to claim 17, wherein the processor is configured to read the executable instructions from the memory, and execute the executable instructions to:

display a setting page of the dynamic comment identification, in response to the triggering operation; and receive setting information inputted through the setting page, and add the dynamic comment identification to the video based on the setting information, to display the dynamic comment identification based on the setting information in the process of paying the video.

19. The electronic device according to claim 18, wherein the processor is configured to read the executable instructions from the memory, and execute the executable instructions to:

receive the at least one dynamic comment content inputted through the setting page.

20. A non-transitory computer-readable storage medium, storing a computer program, wherein the computer program, when executed by a processor, causes the processor to:

receive a trigger operation on a dynamic comment control associated with a video; and add a dynamic comment identification to the video, in response to the triggering operation, to display the dynamic comment identification in a process of playing the video, wherein the computer program, when executed by the processor, causes the processor to: receive at least one dynamic comment content, to display the dynamic comment identification comprising the at least one dynamic comment content in the process of playing the video, and to display a dynamic comment corresponding to the at least one dynamic comment content on a video playing interface in response to a trigger operation on the dynamic comment identification; or play a video on a video playing interface, wherein a dynamic comment identification is added to the video and displayed on the video playing interface, and the dynamic comment identification added to the video comprises at least one received dynamic comment content; receive a trigger operation on the dynamic comment identification on a video playing interface; and display a dynamic comment corresponding to the dynamic comment content on the video playing interface, in response to the trigger operation.

* * * * *